United States Patent [19]

Aoki et al.

[11] 4,386,836
[45] Jun. 7, 1983

[54] ELECTRO-PHOTOGRAPHIC PRINTER

[75] Inventors: Kenji Aoki; Haruo Nakamura; Teiji Miura; Mitsuo Nagata, all of Suwa, Japan

[73] Assignee: Kabushiki Kaisha Suwa Seikosha, Tokyo, Japan

[21] Appl. No.: 220,484

[22] Filed: Dec. 29, 1980

[30] Foreign Application Priority Data

| Dec. 28, 1979 | [JP] | Japan | 54-171799 |
| Jan. 8, 1980 | [JP] | Japan | 55-745 |
| Jan. 10, 1980 | [JP] | Japan | 55-1576 |
| Feb. 13, 1980 | [JP] | Japan | 55-16326 |
| May 26, 1980 | [JP] | Japan | 55-69857 |
| Oct. 6, 1980 | [JP] | Japan | 55-139458 |

[51] Int. Cl.³ .......................................... G03G 15/00
[52] U.S. Cl. .................................... 355/3 R; 350/346; 355/71
[58] Field of Search .................... 355/3 R, 11, 16, 40, 355/71; 101/DIG. 13; 350/331 R, 346

[56] References Cited

U.S. PATENT DOCUMENTS

| 3,824,604 | 7/1974 | Stein | 355/40 |
| 3,995,954 | 12/1976 | Dir et al. | 350/331 R |
| 4,009,934 | 3/1977 | Goodwin et al. | 350/346 |
| 4,110,794 | 8/1978 | Lester et al. | 355/40 X |
| 4,119,842 | 10/1978 | Hayden et al. | 350/346 X |
| 4,194,833 | 3/1980 | Lester et al. | 355/14 CU |
| 4,236,155 | 11/1980 | Nagata | 350/346 X |
| 4,297,022 | 10/1981 | Lester | 350/331 R |

FOREIGN PATENT DOCUMENTS 50-74340 6/1975 Japan .

OTHER PUBLICATIONS

Chang and Loebner, Crossover Frequencies and Turn-Off Time Reduction Scheme for Twisted Nematic L.C. Displays; Applied Physics Letters, vol. 25, No. 1, Jul. 1, 1974.

Bak, Ko and Labes, Fast Decay in a Twisted Nematic Induced by Frequency Switching; Journal of Applied Physics, vol. 46, No. 1, Jan. 1975.

Primary Examiner—R. L. Moses
Attorney, Agent, or Firm—Blum, Kaplan, Friedman, Silberman & Beran

[57] ABSTRACT

An electro-photographic printer utilizing a liquid crystal material which operates as a light valve. The liquid crystal material is sandwiched between two base plates which include electrodes which define a plurality of micro-shutters. A light source illuminates one side of the liquid crystal material. A driving circuit selectively applies driving signals to the electrodes for selectively opening and closing the micro-shutters to allow light from the light source to pass therethrough. A photosensitive drum on the other side of the liquid crystal receives the light transmitted through the liquid crystal to form characters. The characters are transmitted to a recording paper. The liquid crystal material, which has an inverted dielectric anisotropy on opposite sides of the critical frequency, is selectively driven by selectively applying two different frequency signals to the liquid crystal.

36 Claims, 62 Drawing Figures

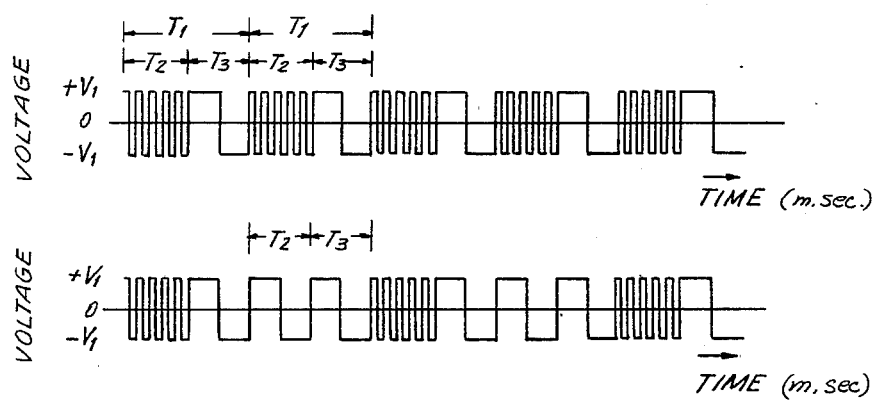
FIG.11a
FIG.11b
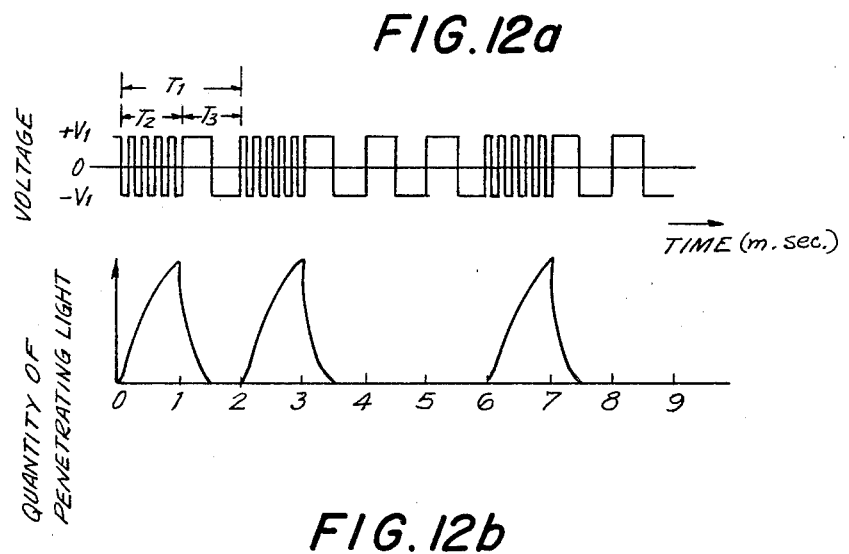
FIG.12a
FIG.12b

FIG.14b₁ 
FIG.14b₂ 
FIG.14a-b₁ 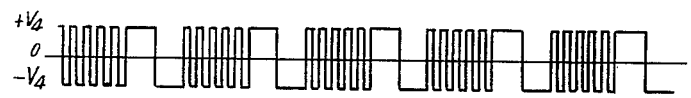
FIG.14 a-b₂

FIG.15a-b 
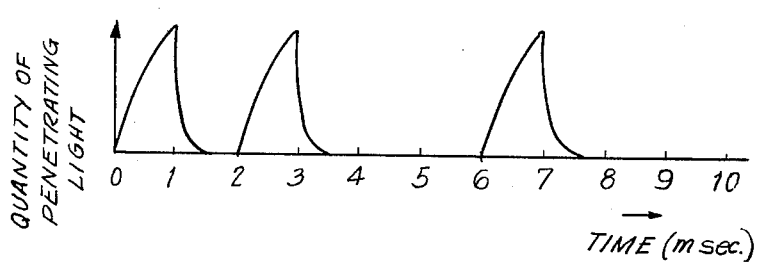
FIG.15c

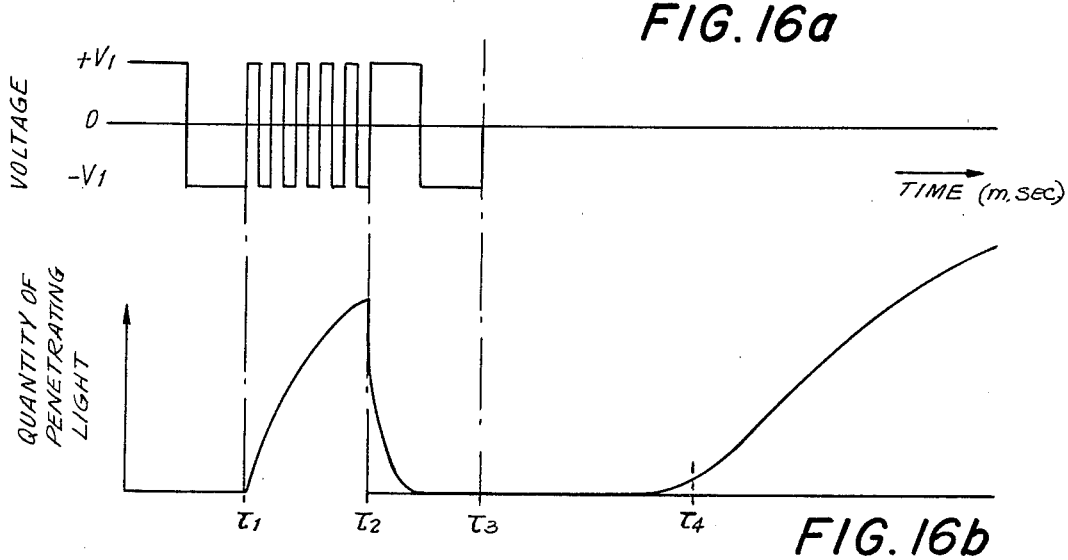
FIG. 16a
FIG. 16b

FIG. 17b₁ 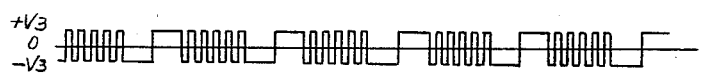
FIG. 17b₂ 
FIG. 17a-b₁ 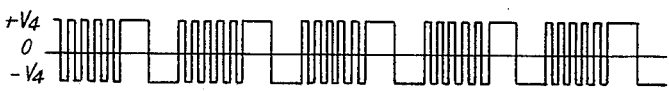
FIG. 17a-b₂ 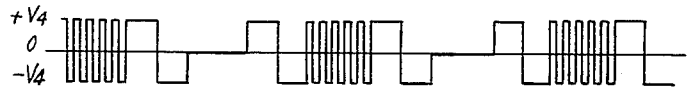

FIG. 18a-b 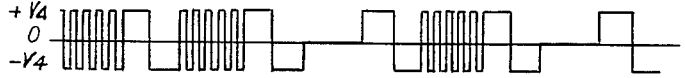

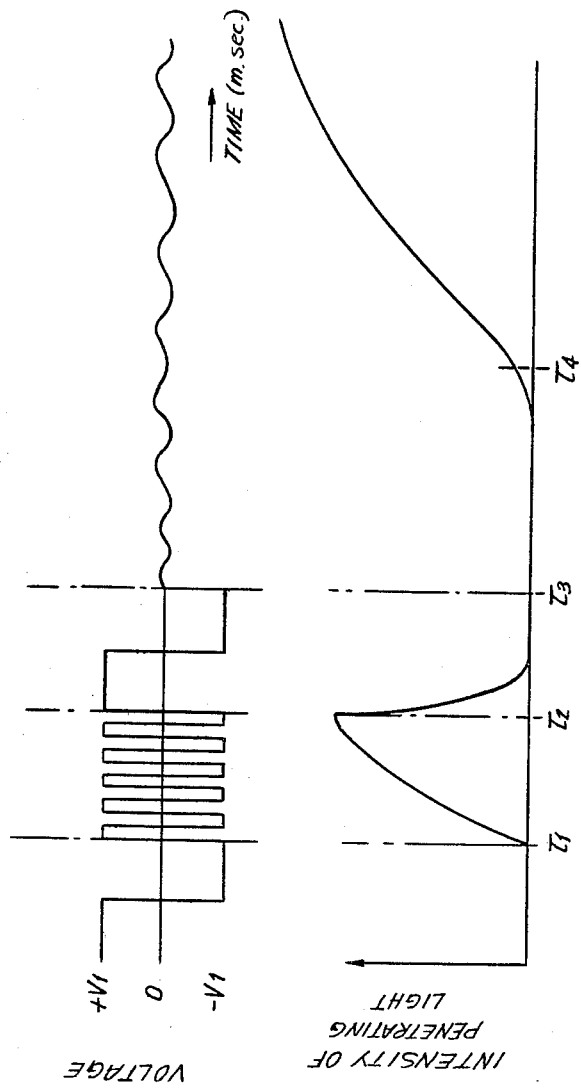

FIG.22a
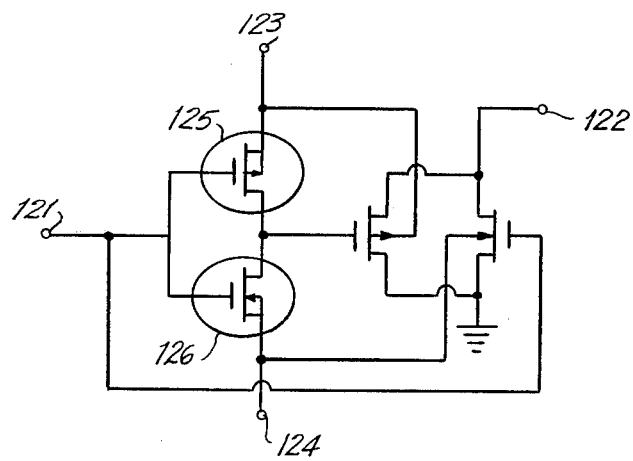
FIG.22b  FIG.22c
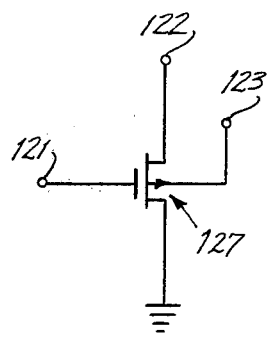
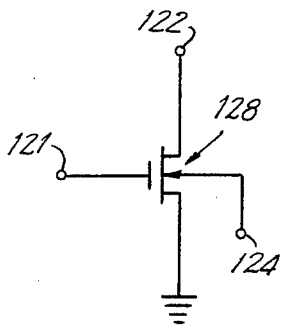

FIG. 23a
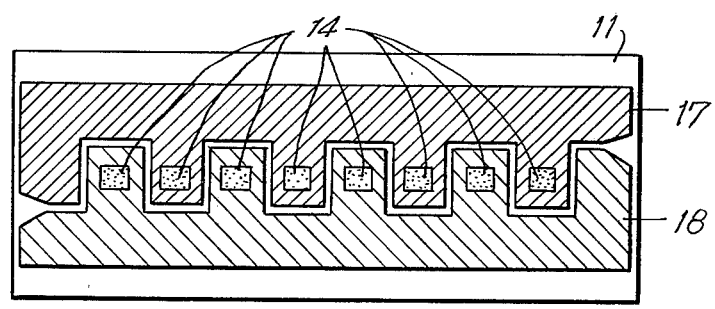
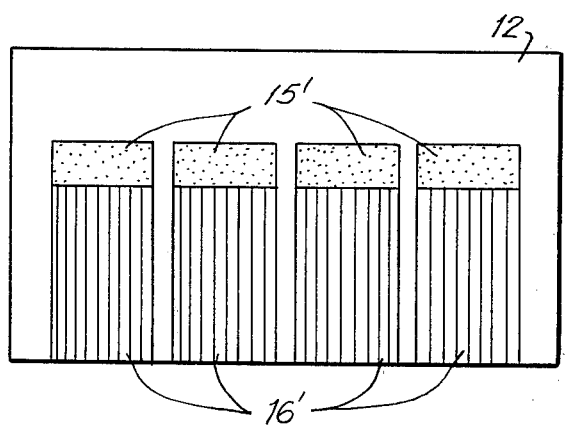
FIG. 23b

| $A_n$ | H | L | H | L |
| --- | --- | --- | --- | --- |
| $A_{n+1}$ | H | L | L | H |
| CE1 | H | L | L | L |
| CE2 | L | H | L | L |
| CE3 | L | L | H | L |
| CE4 | L | L | L | H |

L.C. DRIVING
CIRCUIT 9

ELECTRO-PHOTOGRAPHIC PRINTER

BACKGROUND OF THE INVENTION

This invention is directed to an electro-photographic printer and, in particular, to an electro-photographic printer utilizing a liquid crystal cell which operates as a light valve.

The recent advancement in semiconductor technology has caused a substantial reduction in the cost of central processing units, memories and the like for computers. This progress allows many more consumers to purchase and operate such systems and to learn how to use micro-computers and office computers, as well as printers which print out from these computers. Accordingly, the present advance in technology benefits not only specialists in electronic data processing systems (EDPS) but also the general consumer. Hence, improved output printing systems which can print out ordinary documents as well as documents having Chinese characters or Japanese letters are presently needed.

A typical example of an output printing system for a computer or the like is a Japanese word processing system. The printer utilized as an output terminal for the output system of a computer requires a resolution on the order of 32×32 dots for printing Chinese characters or the like. Such a printer is required to have a high resolution and a high speed without sacrificing one for the other.

At the present time, an electro-photographic printer utilizing a laser or optical fiber tubes (OFT), or a multi-stylus electrostatic printer are in use. However, these printers are extremely expensive and accordingly increase the manufacturing cost of the data output system. The expensive cost retards the spread of various output systems to the general market in spite of the market need therefor. This is also basically true with respect to high speed facsimile printers, cathode ray tube (CRT) hard copiers, and terminal equipment of several varieties. Accordingly, an electro-photographic printer having a high resolution, a high quality printing and a high printing speed, yet reduced in cost, is extremely desired.

SUMMARY OF THE INVENTION

Generally speaking, in accordance with the instant invention, an electro-photographic printer utilizing a liquid crystal material which operates as a light valve, is provided.

The electro-photographic printer of the instant invention includes a light source for illuminating one side of a liquid crystal light valve and a driving circuit for driving the liquid crystal. Also included are a photosensitive drum, a developing mechanism and a fixing mechanism. A liquid crystal material is utilized in the light valve and is sandwiched between two base plates. The base plates include electrodes which define a plurality of micro-shutters. The liquid crystal material has an inverted dielectric anisotropy on opposite sides of the critical frequency. The liquid crystal is driven by a double frequency driving method for selectively opening and closing the micro-shutters.

Accordingly, it is an object of the instant invention to provide an improved electro-photographic printer.

Another object of the instant invention is to provide an improved electro-photographic printer which utilizes liquid crystal material as a light valve.

A further object of the instant invention is to provide an improved electro-photographic printer utilizing a liquid crystal material which is driven by a double frequency driving method so that the printing speed is highly increased.

A still further object of the instant invention is to provide an improved electro-photographic printer which provides a high resolution and high quality printing which can be used as a data print-out system for computer systems.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIGS. 11, 12, 13, 14, 15, 16, 17, 18 and 19 are graphs depicting alternative driving signals applied to the liquid crystal and the response characteristics of the penetrating light;

FIGS. 22a, 22b and 22c are alternative schematic diagrams of switches utilized in the driving circuit of the liquid crystal material of the present invention;

FIGS. 23a and 23b depict alternative constructions of the glass base plates and the electrodes thereon included in the liquid crystal light valve in accordance with an alternative embodiment of the invention;

DESCRIPTION OF THE PREFERRED EMBODIMENTS

Figure 1:
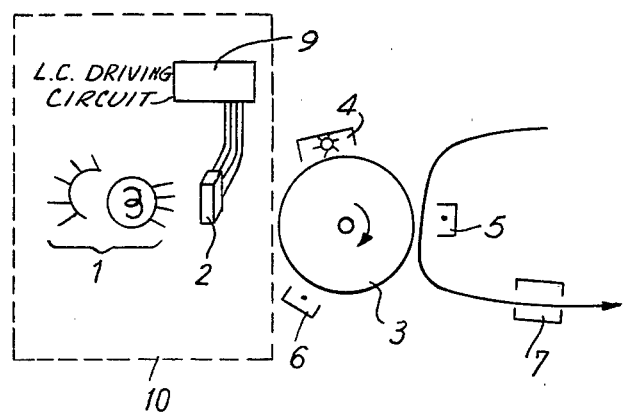
FIG. 1 is a schematic diagram depicting the construction of the electro-photographic printer utilizing a liquid crystal light valve constructed and arranged in accordance with the instant invention.
Figure 2:
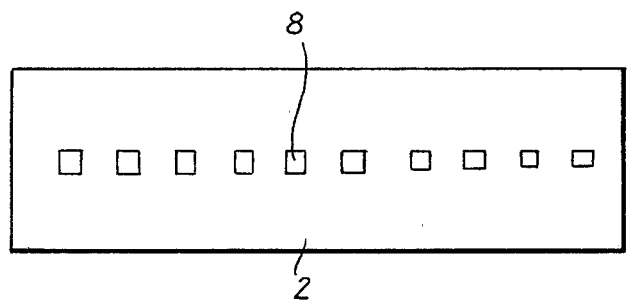
FIG. 2 is a schematic diagram of the micro-shutters of the liquid crystal light valve depicted in FIG. 1.

Reference is first made to FIGS. 1 and 2 wherein the construction of an electro-photographic printer constructed and arranged in accordance with the instant invention utilizing a liquid crystal light valve, is depicted. A light source 1 illuminates a liquid crystal light valve 2. Liquid crystal light valve 2 is provided with a plurality of micro-shutters 8, as described in detail below. Each micro-shutter 8 is optically opened and closed independently by a liquid crystal driving circuit 9. When a micro-shutter 8 is opened, it allows the light from light source 1 to penetrate therethrough. Alternatively, when a micro-shutter 8 is closed, light will not penetrate therethrough. Light source 1, light valve 2 and driving circuit 9 form a light signal generating portion 10.

A light signal generated through a given micro-shutter 8 arrives at a photo-sensitive portion or drum 3. Since the photo-sensitive portion 3, provided with photoconductors, is continuously recharged by a charging source 6, the charge at the position where the light signal arrives is removed. Therefore, electrostatic latent images according to external writing signals are formed on drum 3. The electrostatic latent images thus formed are developed with color toner by a developing portion 4. Thereafter, the toner images are transcribed onto a recording medium, such as paper, by a transcribing portion 5. Then, the transcribed images are fixed by heat or the like by a fixing mechanism 7 to complete the printing of the images onto the recording medium.

As aforementioned, since the portion of the printer corresponding to the precision high speed optical scanning system of a laster printer, for example, is not required for an electrophotographic printer utilizing a liquid crystal light valve, such a printer will provide numerous benefits. For example, the electrostatic printer in accordance with the present invention has a simplified construction and is therefore cheaper to manufacture. However, an electro-photographic printer utilizing a liquid crystal light valve of the type described herein has a fatal problem and the practical use thereof is difficult. The problem is that the writing speed is too slow due to the liquid crystal characteristics and the driving method thereof. The present invention remedies these defects by providing an electro-photographic printer which can be operated at the high speeds required.

Required specifications of a printing portion of a printer applicable to the above-mentioned output systems are a printing speed of 10 sheets of paper of A4 format (about 21 cm×29.5 cm) per minute and a resolution on the order of 10 dots/mm. In other words, the printing speed must be about 500 lines per second. Thus, a writing time for one line is less than 2 msec. However, where the twisted nematic (TN) mode liquid crystal is utilized and the liquid crystal is driven by the conventional alternating voltage driving method, an opening period of the micro-shutter of 2 msec. cannot be achieved.

Thus, when a liquid crystal cell of minimum thickness for practical use, which was believed to have the fastest response time available was used, and the temperature thereof was increased up to 40° C., a writing time of less than 2 msec. could not be achieved.

The voltage parameter of the driving signals has relevance as to the rising characteristic (rise time) of the response of the liquid crystal and the rising characteristic is improved to some degree by varying the voltage. However, the falling characteristic (decay time) is a problem. The falling characteristic depends very little on the voltage parameter. It depends instead on the thickness of the liquid crystal cell and the temperature thereof. An unsatisfactory result was obtained even under the best conditions, as mentioned above, utilizing a liquid crystal having the following characteristics:
1. liquid crystal: phenylcyclohexene liquid crystal
2. thickness of cell: 3 μm
3. driving voltage: 5 V
   frequency: 100 Hz
4. temperature: 40° C.
5. risetime: 2 msec.
6. falltime: 20 msec.

Alternatively, for use in the light valve, literature describing a printer utilizing a PLZT (Pb1-(3/2)×Lax (Zry Tiz) 0₃) solid element has been published. PLZT is actuated by controlling the direction of polarization of the penetrating light in the same manner as the liquid crystal. Differing from the previous liquid crystal utilized, the switching speed of PLZT is fast enough for practical use. However, due to restrictions on manufacture, the writing for one line, for example for 20 cm on a sheet of A4 format, is very expensive, and thus is not practical to use.

As aforenoted, in spite of the present need for a less expensive compact printer having a high printing speed and a high quality printing which is useable in various output systems, a satisfactory printer has not heretofore been available. Therefore, the present invention aims at providing a low-priced and compact electro-photographic printer of high speed and high quality. The invention will now be described.

Though a construction of this invention is fundamentally the same as the construction depicted in FIG. 1, this invention utilizes a suitable twisted nematic liquid crystal having the desired characteristic such as Merck 1085, Kodak 11650 and the like. Kodak 11650 is para-n-pentylphenyl-2-chloro-4-(p-n-pentylbenzoyloxy) benzoate. This invention also uses a driving method for the liquid crystal which speeds up the printing, making the most of the construction of the electro-photographic printer.

Figure 3:
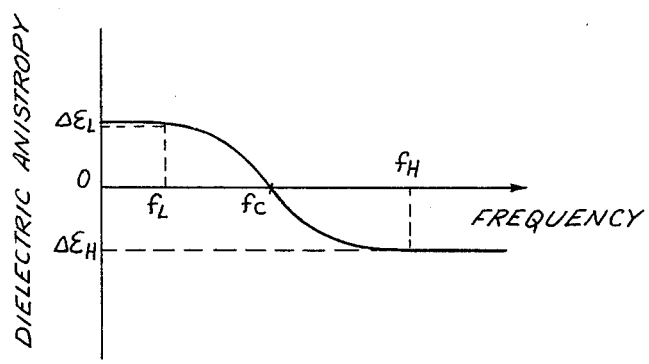
FIG. 3 is a graph depicting the frequency characteristics verses the dielectric anisotropy of the liquid crystal material utilized in the instant invention.

The graph in FIG. 3 depicts the dielectric anisotropy as a function of frequency of the liquid crystal material used in this invention. $\epsilon_L$ and $\epsilon_H$ are the dielectric anisotropys, respectively, of the low frequency $f_L$ which is lower than the critical frequency fc and has positive dielectric anisotropy and of the high frequency $f_H$ which is higher than the critical frequency fc and has negative dielectric anisotropy. $\epsilon_L > 0$ and $\epsilon_H < 0$. In the case where a nematic liquid crystal having such a characteristic is used as a TN mode element, molecules of the liquid crystal are aligned with the direction of the electric field when a signal $f_L$ is applied to the liquid crystal and they are aligned perpendicularly to the direction of electric field when a signal of $f_H$ is applied. Disposing polarizing plates on both surfaces of the liquid crystal layer of twisted nematic orientation and making the polarizing directions thereof perpendicular to one another, the light will not pass through when $f_L$ is applied and the light will penetrate when $f_H$ is applied.

Figure 4:
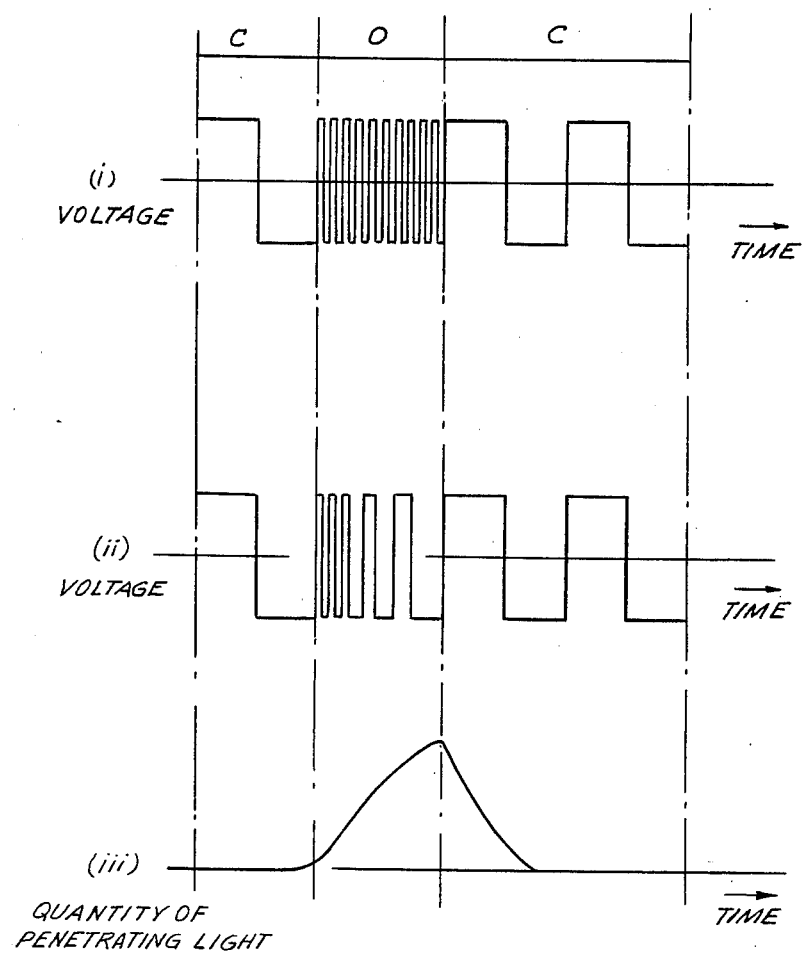
FIG. 4, 5 and 6 are graphic representations depicting driving signal wave forms for driving the liquid crystal material and the response characteristics of the penetrating light.

FIG. 4 is a graphic representation of driving signals applied to the liquid crystal and the response characteristic of the quantity of penetrating light with respect to the applied signals. The period C is a state where the shutter is closed and the period 0 is a state where the shutter is open. Waveform i is a fundamental applied signal for switching the shutter with $f_L$ and $f_H$. The frequency of the signal applied in the period C is $f_L$ and the frequency in the period 0 is $f_H$. Waveform ii is a signal the frequency of which varies gradually down to $f_L$ from $f_H$. Waveform iii shows the response of the penetrating light with respect to the above-mentioned applied signals. As seen from FIG. 4, the slow decay time which was a serious problem in the conventional driving method, is completely remedied in this driving method, since the liquid crystal molecules are forcibly aligned parallel to the glass base plates of the cell by applying the high frequency $f_H$ electric field. In waveform iii, the falling represents the direction in which the quantity of the penetrating light is decreased. However, occasionally, the molecules of the liquid crystal are not aligned in one direction due to a powerful high frequency electric field and domain phenomena occur. The method for suppressing the domain phenomena to gradually reduce the frequency $f_H$ is shown in waveform ii. Accordingly, a satisfactory response characteristic of the penetrating light is obtained.

Figure 5:
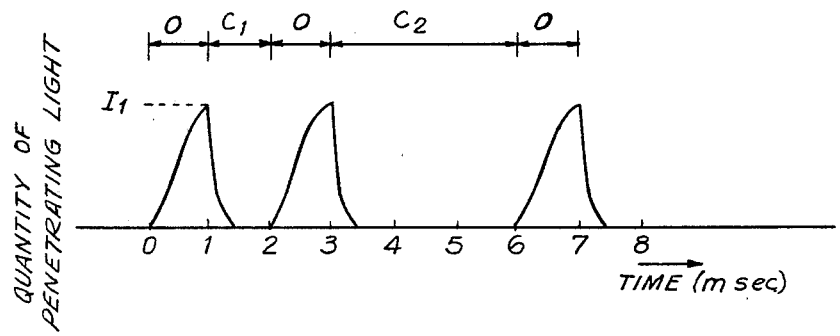
Figure 6:
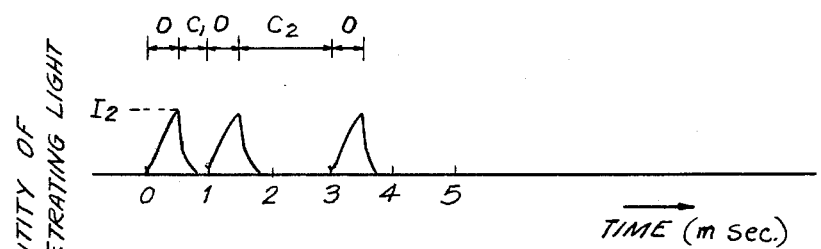

Reference is now made to FIGS. 5 and 6. FIG. 5 shows an example where the opening period 0, when the high frequency signal is applied, is 1 msec. $C_1$ and $C_2$ are closing periods when the low frequency signals are applied. $C_1$ and $C_2$ are respectively 1 msec. and 3 msec. In this case, a minimum writing cycle for one dot is $0 + C_1$, that is 2 msec., so that the desired characteristic can be obtained.

FIG. 6 shows an example where an opening period is 0.5 msec. Closing periods $C_1$ and $C_2$ are respectively 0.5 msec. and 1.5 msec. In this case, though a peak value of the quantity of the penetrating light $I_2$ is one-half of $I_1$ in FIG. 5, a minimum writing cycle is 1 msec., which is an extremely fast response characteristic. Thus, the fast switching speed, which has not been realized under the conventional driving method, is obtained according to this invention as described below.

In accordance with this invention, the twisted nematic liquid crystal is used, such as Merck 1085, and polarizing plates are disposed on either side of the liquid crystal and the polarizing directions thereof are perpendicular to each other. Therefore, the light does not penetrate when $f_L$ is applied and the light penetrates when $f_H$ is applied as discussed above. On the other hand, the light will penetrate when no electric field is applied to the liquid crystal. The light always penetrates through portions on which no electrodes are arranged and to which no electric field is applied due to the twisted nematic structure of the liquid crystal.

Figure 7:
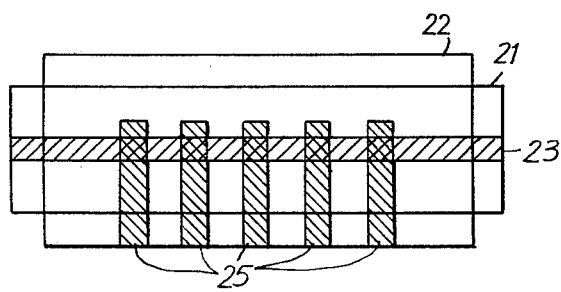
FIGS. 7, 8 and 9 depict various constructions of the base plates and electrode arrangements thereon utilized in the liquid crystal light valve of the instant invention.

FIG. 7 shows a simple electrode arrangement. Glass base plates 21 and 22 are provided with electrodes 23 and 25 respectively. A liquid crystal layer is sandwiched between these two glass base plates. Applying the voltage between the electrodes 23 and 25, micro-shutters defined as the portions where the clectrodes 23 and 25 overlap each other are opened and closed. However, the light will also penetrate through the other portions of the light valve.

It is a necessary condition for the light valve used in the electro-photographic printer in accordance with this invention that no light penetrates through portions other than the micro-shutters. Two ways may be effective to eliminate this problem. One way is to dispose the polarizing plates so as to make the polarizing directions parallel to each other. The other way is to provide portions where no electrode is arranged with an opaque material. The former has a serious defect. Namely the light penetrates when the molecules of the liquid crystal are not in a completely twisted orientation. What is necessary for the light valve is that the light be blocked off when not required so as to not actuate the photo-sensitive drum. In order to completely block the light, the polarizing plates have to be disposed so that the polarizing directions thereof are perpendicular to one another. Therefore, the latter method proves more effective.

Figure 8:
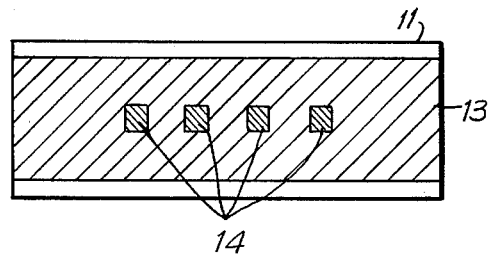
Figure 9:
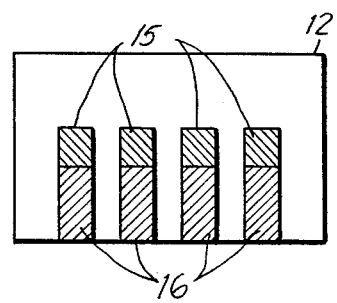

FIGS. 8 and 9 show an electrode arrangement in accordance with this invention. The light valve is formed by liquid crystal material sandwiched between spaced glass base plates 11 (FIG. 8) and 12 (FIG. 9). The glass base plate 11 in FIG. 8 is provided with a common electrode consisting of portions 13 and 14. The glass base plate 12 in FIG. 9 is provided with a plurality of independent signal electrodes 15. Electrode portions 14 and 15 are deposited on the respective facing inside surfaces of the glass plates and are formed of transparent conductive film such as indium oxide or the ike. The portions where the electrodes 14 and 15 overlap each other define the micro-shutters. Opaque metallic electrode portions 13 and 16 are formed from deposited films of chromium, gold or the like. The metallic electrodes 13 and 16 are in respective electrical connection with transparent electrode portions 14 and 15 and prevent the light from penetrating through portions of the light valve other than the micro-shutters. In addition, the metallic electrodes make it possible to reduce the wiring resistance. The driving signals used in this invention include a high frequency signal. Therefore, it is necessary to minimize the rounding of the wave form of the driving signal, so that low wiring resistance is a necessary condition. Thus, the use of the metallic electrode has the effects of preventing the light from penetrating where not desired and of reducing the wiring resistance. The adoption of the above-mentioned construction and driving method allows the liquid crystal light valve to have the superior response characterists required for use in an electrophotographic printer.

The light from light source 1 (FIG. 1) penetrates through only the transparent electrode 14. Micro-shutters 8 are defined by the transparent electrodes 14. The signals to open and close the micro-shutter are applied to each signal electrode. Although only four pairs of signal electrodes 15, 16 and transparent electrodes 14 are depicted, there are about 2,000 pairs of electrodes in a practical liquid crystal light valve for a printer.

It is possible to arrange a transparent conductive film above or below the metallic electrodes 13 and 16. The liquid crystal light valve is formed by sandwiching the liquid crystal layer between the glass base plates 11 and 12 which are faced to each other and then sandwiching the glass base plates between the polarizing plates which are disposed so as to make the polarizing directions thereof perpendicular to one another.

Figure 10A:
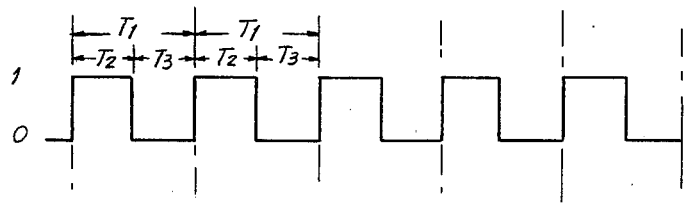
FIG. 10 is a timing chart which graphically represents the opening and closing of a micro-shutter of the liquid crystal light valve.
Figure 10B:
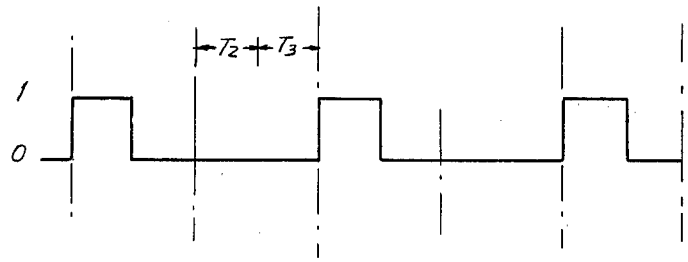

FIG. 10 is a timing chart illustrating the opening and closing of the micro-shutters. The abscissa is the time. The micro-shutter is closed at level 0, and the micro-shutter is opened at level 1. Waveform A shows the case where the micro-shutter is continuously opened and closed. Waveform B shows the case where the micro-shutter is opened but remains closed for a double period. A time for one complete cycle is $T_1$ and the writing time for one dot equals $T_1$. In waveform A, a signal to close the micro-shutter is applied in $T_3$. In $T_2$, a signal to open the micro-shutter is applied. On the other hand, in waveform B, a signal to close the micro-shutter is applied in $T_2$. As aforenoted, it is the signal of $f_H$ that opens the micro-shutter, and it is the signal of $f_L$ that closes the micro-shutter.

Figure 31A:
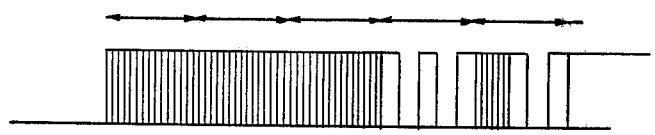
FIG. 31 is a graph depicting conventional driving signals for driving a liquid crystal and the optical response wave form thereof.
Figure 31B:
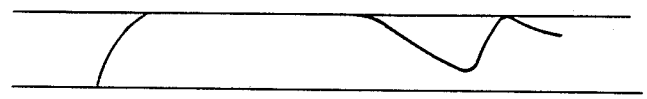

The application of the signal of $f_L$ in each writing cycle has two purposes. One purpose is that dots are uniformly formed in spite of the continuous rotation of the photo-sensitive portion. The other purpose, which is more important, is that the hysteresis peculiar to liquid crystal material is completely removed by providing a time to apply the low frequency signal for each writing cycle, and dots are rapidly and successively formed one by one. As depicted in FIG. 31a, if the micro-shutter is to be opened for three successive periods and the signal of $f_H$ is continuously applied during these periods, the decay period increases by several times that obtained if only a single period of application of $f_H$ is used. The decay period for the driving signal of FIG. 31a is shown in FIG. 31b, when the micro-shutter is closed. Therefore, applying the writing signals of $f_H$ one after the other, the lag in the decay period is steadily accumulated, and the micro-shutter is left opened. Though the usual TN liquid crystal or the two-frequency driving liquid crystal is driven by a matrix driving method utilizing the hysteresis effect, the hysteresis is detrimental to the purpose of this invention and must be removed as much as possible. It is important for the rapid and successive generation of individual light signals that the liquid crystal light valve is driven so as to begin on the following writing cycle after the potential inside the liquid crystal is reduced to the predetermined level by applying the low frequency signal for each writing cycle. In particular, this invention provides a two-frequency driving method for the liquid crystal based on different requirements and different principles than those of the two-frequency driving method utilized for display.

FIG. 11a depicts driving signals which are applied to the liquid crystal corresponding to the opening and closing of the micro-shutter in using alternative $f_H$ and $f_L$ signals during periods $T_2$ and $T_3$. These signals have the voltages of $\pm V_1$ volts. When each signal is applied to the signal electrode 15 in FIG. 9 and the signal applied to the common electrode is 0 volts, each micro-shutter is opened and closed by the $f_H$ and $f_L$ signals respectively.

FIG. 12b depicts the response characteristic of the penetrating light with respect to the driving signal of FIG. 12a. The performance (response characteristic) depicted is obtained when $f_L$ is 1 KHz, $f_H$ is 100 KHz, the temperature of the liquid crystal is 40° C. and $V_1$ is 30 V. In this case, the writing time $T_1$ is 2 msec. which is a high speed writing time. However, it is difficult to arrange in parallel 2,000 driving circuits each of which can output a signal of 100 KHz with 30 V as $V_1$, that is, having a peak-to-peak voltage of 60 V. Since a voltage as low as possible is desirable, the same signal as the signal in FIG. 11a is always applied to the common electrode in one embodiment of the invention, and as a result, the driving voltage $V_1$ is reduced. In this embodiment when the phase relationship of the driving signals of FIGS. 11a and 12a are selected, the voltage across the liquid crystal can still be 30 volts.

FIGS. 13a-1, 13b-1 and 13c-1 are three driving signals which were applied to the light valve according to the invention. In each signal, the signal of $f_L$ was applied up to $\tau_1$, the signal of $f_H$ was applied between $\tau_1$ and $\tau_2$ and the signal of $f_L$ was applied between $\tau_2$ and $\tau_3$, the driving signals of FIGS. 13a-1, 13b-1 and 13c-1 are identical with the driving signal of FIG 12a and the voltages $V_1$ thereof were also 30 V. After $\tau_3$, in each signal, a signal where the signals of $f_H$ and the signal of $f_L$ are superimposed was applied. (Hereinafter, such a signal is referred to as an $f_L f_H$ mixed signal.) The voltages of the signal of $f_L$ were $\pm V_1/2$ in all of the driving signals of FIGS. 13a-1, 13b-1 and 13c-1. As for the voltages of the signal $f_H$, they were respectively $\pm V_1/2$, $\pm V_2$ and $\pm V_3$ for the signals of FIGS. 13a-1, 13a-2 and 13a-3. FIGS. 13a-1, 13b-1 and 13c-2 show the response characteristics of the penetrating light when the respective signals of FIGS. 13a-1, 13b-1 and 13c-1 are applied to the liquid crystal. The three response characteristics precisely agreed with the response characteristic depicted in FIG. 12b up to $\tau_3$. After $t_3$, however, in the case of the signal of FIG. 13a-1, no light penetrated through the liquid crystal and the micro-shutter remained closed when the $f_L f_H$ mixed signal was applied. In the case of the signal of FIG. 13b-1, although the micro-shutter remained closed up to $\tau_4$, the light gradually penetrated through the liquid crystal light valve after $\tau_4$. In the case of the signal of FIG. 13c-1, although the micro-shutter remained closed up to $\tau_5$, the light gradually penetrated thereafter in the same manner as in FIG. 13b-2.

Figures 1, 13A:
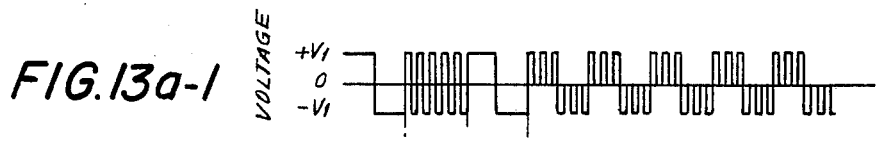
Figures 2, 13A:
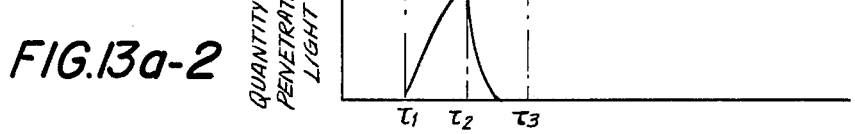
Figures 1, 13B:
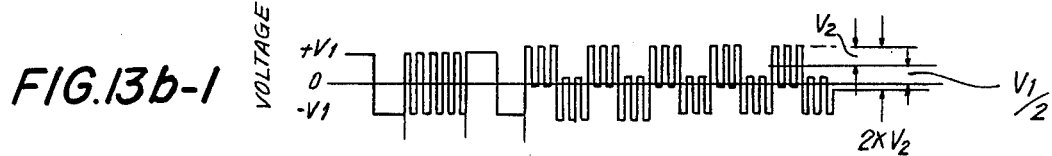
Figures 2, 13B:
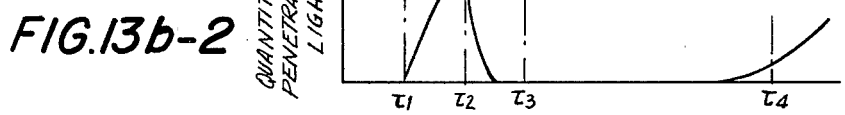
Figures 1, 13C:
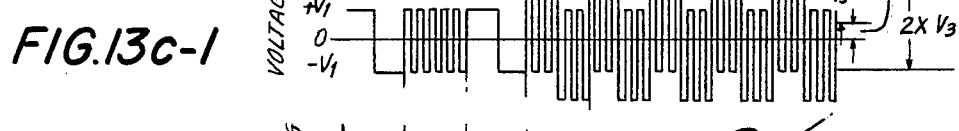
Figures 2, 13C:
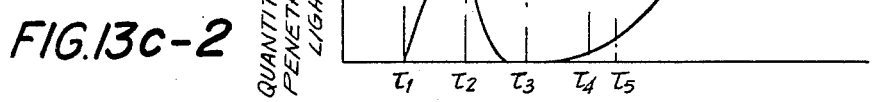

These experimental results teach that no light penetrates through the liquid crystal where the $f_L f_H$ mixed signal applied after $\tau_3$ takes the form of the signal of FIG. 13a-1. Thus, a light penetration characteristic equal to the light penetration when the signal of $f_L$ is applied is obtained by the signal of FIG. 13a-1, i.e. no light penetration. Also, no light penetration occurs, that is the micro-shutter is closed, up to $\tau_4$ or $\tau_5$ in the case of using the $f_L f_H$ mixed signal after $\tau_3$ of FIGS. 13b-1 and 13c-1, respectively. By adopting such phenomena, the driving voltage of the liquid crystal light valve utilized in the electro-photographic printer in accordance with this invention is reduced by one-half.

Figure 14A:

FIG. 14 depicts other driving signals which can be used to drive the liquid crystal light valve. FIG. 14a depicts a signal applied to the common electrode in FIG. 8, while FIGS. 14$b_1$ and 14$b_2$ are signals to open and close the micro-shutter corresponding to the signals of FIGS. 10A and 10B, applied to the signal electrode in FIG. 9. The signals in FIGS. 14$b_1$ and 14$b_2$ are 180° out of phase with the signal in FIG. 14$a$. FIG. 14$b_1$ is the signal to successively open and close the micro-shutter in each period and FIG. 14$b_2$ is the signal to open and close the micro-shutter in every other period, the micro-shutter remaining closed for the intervening periods. By applying each of these signals to the signal electrode, the signals of FIGS. 14$a$-$b_1$ and 14$a$-$b_2$ are respectively applied across the liquid crystal material. In this case, $V_2$ is equal to $V_3$. The signal of FIG. 14$a$-$b_1$ is the same as the signal of FIG. 11$a$. However, the difference between the signal of FIG. 14$a$-$b_2$ and the signal of FIG. 11$b$ is that the signal to close the micro-shutter in FIG. 14$a$-$b_2$ is the $f_L f_H$ mixed signal illustrated in FIG. 13$a$-1 while the signal of $f_L$ is used to close the micro-shutter in the signal of FIG. 11$b$.

Figure 15B:
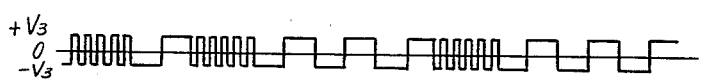

FIG. 15$c$ shows the response characteristic of the penetrating light when the micro-shutter is opened and closed by applying the signal of FIG. 15$a$-$b$ to the liquid crystal. The signal of FIG. 15$b$ is 180° out-of-phase with the signal of FIG. 14$a$. The timing chart to open and close the micro-shutter is identical with that of FIG. 12$a$. The signal of FIG. 14$a$ is applied to the common electrode. The signal of FIG. 15$b$ is applied to one of the signal electrodes. In result, the signal of FIG. 15$a$-$b$ is applied across the liquid crystal layer and the response characteristic of the penetrating light as shown is obtained. Though this response characteristic is the same as that in FIG. 12$b$, where the conditions are that $f_L$ is 1 KHz, $f_H$ is 100 KHz and the temperature is 40° C., the driving voltages $V_2$ and $V_3$ in FIGS. 14 and 15 are reduced to one-half, namely, 15 V, as compared with the driving voltage $V_1$ in FIG. 12$a$ of 30 V.

With reference to FIG. 14, the common signal in which the signal of $f_L$ and the signal of $f_H$ are alternatively switched is continuously applied to the common electrode. A 180° out-of-phase signal is applied to each of the plurality of signal electrodes each time the signal of $f_L$ in the common signal is applied. When the signal of $f_H$ is applied in the common signal, the 180° out-of-phase $f_H$ signal is applied in order to open the micro-shutter and a signal of lower frequency than $f_c$, for example the signal $f_L$, is applied in order to keep the micro-shutter closed. Accordingly, using the signals in FIGS. 14 and 15, an electrophotograph printer utilizing the liquid crystal light valve driven by a reduced voltage is provided.

EXAMPLE 1

An example using the above-mentioned liquid crystal light valve and driven by the signals depicted in FIGS. 14$a$ and 15$b$, is described in the following. The liquid crystal composition utilized was the Merck 1085. The writing time $T_1$ of 2 msec. was achieved under the conditions that the above-mentioned liquid crystal light valve was kept at 40° C., the driving voltages $V_2$ and $V_3$ were 15 V, $f_L$ and 1 KHz and $f_H$ was 100 KHz. The opening of the micro-shutter was a square with a side 50 μm long. A fluorescent lamp of 30,000 lux intensity on the liquid crystal light valve was used as the light source. By writing electrostatic latent images on a paper for an electrofacsimile printer, developing the images with toner and then fixing the images on the paper, dots of 100 μmΦ were formed.

FIG. 16 depicts other experimental results achieved according to this invention. The signal of FIG. 16$a$ was used in this experiment. The signal of $f_L$ was applied up to $\tau_1$, the signal of $f_H$ was applied between $\tau_1$ and $\tau_2$ and the signal of $f_L$ was applied between $\tau_2$ and $\tau_3$. Up to $\tau_3$, the signal of FIG. 16$a$ was identical with the signal of FIG. 12$a$, and the voltage thereof was ±30 V. The voltage applied after $\tau_3$ as 0 V. The intensity of the penetrating light for the signal of FIG. 16$a$ is the same as that in FIG. 12 up to $\tau_3$. After $\tau_3$, a delay time existed up to $\tau_4$ where the shutter remained closed. However, after $\tau_4$, the intensity of the penetrating light was increased gradually as shown in FIG. 16$b$. The period of $\tau_4$-$\tau_3$ was about 1.8 msec. in this experiment. Thus, this experiment teaches that the micro-shutter is closed for less than 1.8 msec. when no signal of $f_L$ is applied. Therefore, the utilization of the above effect and the alternate application of the signals of $f_L$ and $f_H$ in the same manner as the signal of FIG. 11$a$ reduces the driving voltage.

Figure 17A:

FIG. 17$a$ depicts the signal applied to the common electrode. FIGS. 17$b_1$ and 17$b_2$ depict signals applied to the signal electrodes to open and close the micro-shutter which correspond to the signals of FIGS. 10$a$ and 10$b$. The micro-shutter is successively opened and closed by the signal of 17$b_1$. The micro-shutter is opened for one period and closed for two consecutive periods by the signal of FIG. 17$b_2$. Thus, the difference signals of FIGS. 17$a$-$b_1$ and 17$a$-$b_2$, are applied across the liquid crystal material. The voltage $V_2$ of the signal of FIG. 17$a$ is equal to the voltage $V_3$ of the signals of FIGS. 17$b_1$ and 17$b_2$. In the case where $V_2 = V_3 = V_1/2$, the signal of FIG. 17$a$-$b_1$ is the same as the signal of FIG. 11$a$. The difference between the signal of FIG. 17$a$-$b_2$ and the signal of FIG. 11$b$ is that the signal of FIG. 17$a$-$b_1$ is 0 V at intermediate periods. The micro-shutter should be opened at 0 V. However, since a delay time of $\tau_4$ (FIG. 16) or less is utilized as the period of 0 V, the micro-shutter remains closed during this short interval. The micro-shutter remains closed since the next signal of $f_L$ is applied before the micro-shutter starts to open.

Figure 18B:
Figure 18C:
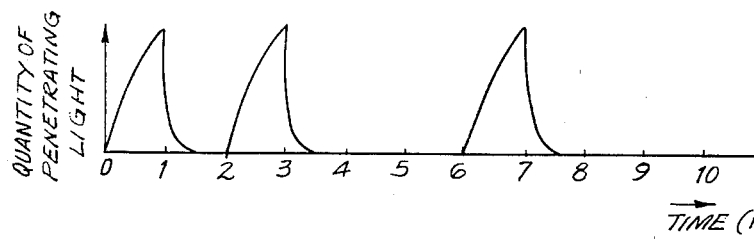

FIG. 18 depicts an example where the micro-shutter is opened and closed by using the common signal of FIG. 17$a$. The signal of FIG. 17$a$ is applied to the common electrode and the signal of FIG. 18$b$ is applied to the signal electrode. In result, a signal of FIG. 18$a$-$b$ is applied to the liquid crystal layer and the response characteristic of the penetrating light as shown in FIG. 18$c$ is obtained. This response characteristic is the same as that of FIG. 12$b$. Even when the voltage is 0 V, no light penetrates through the liquid crystal light valve since the low frequency signal is applied before light starts to penetrate. The parameters utilized with reference to FIG. 18 are identical with those of the embodiment of FIG. 12. That is, $f_L$ is 1 KHz, $f_H$ is 100 KHz and the temperature is 40° C. However, the driving voltages $V_2$ and $V_3$ are reduced by one-half to 15 V, as compared with $V_1$ which is 30 V in FIG. 12.

EXAMPLE 2

An example using the above-mentioned liquid crystal light valve and driven by the signals depicted in FIGS. 17$a$ and 18$b$ is now described.

The writing time $T_1$ of 2 msec. was achieved under the conditions that the above-mentioned liquid crystal light valve was kept at 40° C., the driving voltages $V_2$ and $V_3$ were 15 V, $f_L$ was 1 KHz and $f_H$ 100 KHz. The opening in the micro-shutter is a square with a side 50 μm long. A fluorescent lamp of 30,000 lux intensity on the liquid crystal light valve was used as the light source. Writing electrostatic latent images on a paper for an electrofacsimile printer, developing the images with toner and then fixing the images on the paper, dots of 100 μmΦ were formed in response to these driving signals.

FIG. 19 depicts other results obtained in driving the liquid crystal material. The signal of FIG. 19a was used in this experiment and was applied through a 10 MΩ resistor. The signal of $f_L$ was applied to $\tau_1$, the signal of $f_H$ was applied between $\tau_1$ and $\tau_2$ and the signal of FIG. 12a and the voltage thereof was ±30 V. After $\tau_3$, the voltage was reduced to 0 V. The intensity of the penetrating light for the signal of FIG. 19a was the same as depicted FIG. 12b up to $\tau_3$; after $\tau_3$, up to a delay time of $\tau_4$, the shutter remained closed. After $\tau_4$ the intensity of the penetrating light gradually increased as shown in FIG. 19b. The value of $\tau_4-\tau_3$ was about 10 msec. in this experiment. Thus, this experiment teaches that the micro-shutter remains closed for less than 10 msec. in the case where the signal is applied to the liquid crystal through a resistor.

Figure 20:
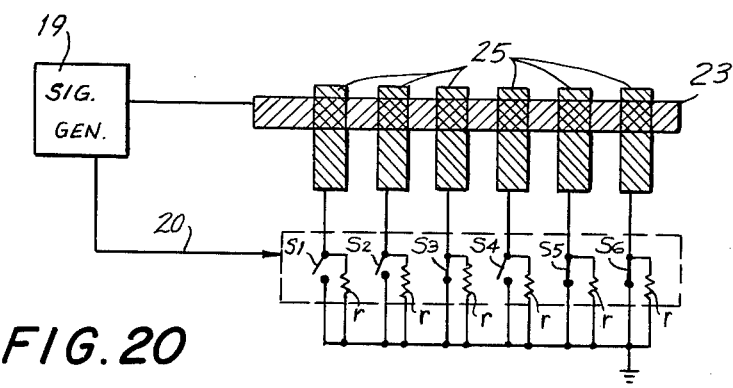
FIG. 20 is a schematic diagram of a circuit for applying driving signals to the liquid crystal in order to selectively open and close the micro-shutters.
Figure 21A:
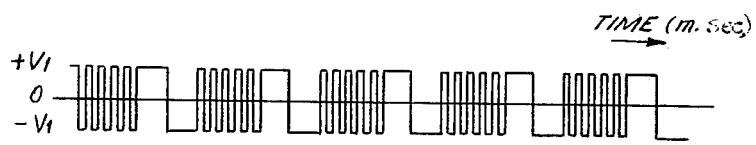
FIG. 21 is a graph depicting alternative driving signals applied to the liquid crystal and the corresponding response characteristics of the penetrating light.

FIG. 20 is a schematic diagram depicting a circuit for applying signals to open and close the micro-shutters in this invention. Common electrode 23 and six signal electrodes 25 are disposed in spaced relation on plates with liquid crystal material therebetween. Signal generator 19 generates a signal applied to the common electrode 23. The signal is composed of a high frequency ($f_H$) signal and a low frequency ($f_L$) signal which are alternatively switched in the same manner as the signal of FIG. 11a. This signal is shown in FIG. 21a. Switches $S_1-S_6$ represent electronic switches such as MOS transistors which are gated between "open" and "closed" states by signals transmitted along lines 20 to respectively control the voltage between common electrode 23 and the corresponding signal electrodes 25. In FIG. 20, switches $S_3$, $S_5$ and $S_6$ are closed, turned ON, and, therefore the respective signal electrodes coupled to switches $S_3$, $S_5$ and $S_6$ are directly grounded. The switches $S_1$, $S_2$ and $S_4$ are open and, thus, are turned OFF. The respective signal electrodes to which switches $S_1$, $S_2$ and $S_4$ are attached are each grounded through their respective resistors r.

Figure 21B:
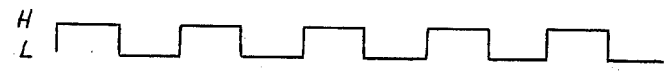
Figures 1, 21C:
Figures 2, 21C:
Figures 1, 21D:
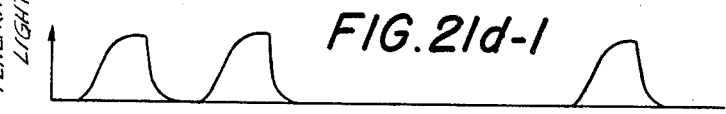
Figures 2, 21D:

A synchronizing signal in the form of FIG. 21b for control of these switches is produced by the signal generator 19. As illustrated, the synchronizing signal of FIG. 21b is high (H) lever when the common electrode signal of FIG. 21a is an $f_H$ signal, and is at a low (L) level when the common electrode signal of FIG. 21a is an $f_L$ signal. Each switch is turned ON. The synchronizing signal controls the timing of the respective signals. The signals of FIGS. 21c-1 and 21c-2 are examples of the switching operation. The switches are turned ON at level H, and are turned OFF at level L. When the switching signals of FIG. 21c-1 or 21c-2, applied to the switches, are at level L during the time that the signal of $f_L$ is applied, the switches are turned ON and the signal of $f_L$ is applied to the liquid crystal and the micro-shutter is closed. When the signals of FIG. 21c-1 or 21c-2 are at level H during the time that signal of $f_H$ is applied, the signal of $f_H$ is applied to the liquid crystal by turning the switches ON and the micro-shutter is opened. On the other hand, by turning the switches OFF by applying a signal at level L thereto at this time, the signal of $f_H$ is applied to the liquid crystal through the resistor r. Since the voltage of the signal of $f_H$ applied to the liquid crystal is divided by the capacity of the liquid crystal and the resistance of resistor r, the divided voltage to the liquid crystal is nearly 0 V. As a result, the micro-shutter remains closed. FIGS. 21d-1 and 21d-2 depict the response chwaracteristics corresponding to the switching signals of FIGS. 21c-1 and 21c-2. These response characteristics are the same as those of FIG. 12b. In addition, according to this embodiment, the signal of $f_H$ is applied to the common electrode and a simple switch is connected to each signal electrode. Thus, the micro-shutter is selectively opened and closed. As a result, the driving circuit for the liquid crystal light valve is extremely simplified.

FIGS. 22a, 22b and 22c show constructions for the switches of FIG. 20. Each of the switches in FIGS. 22a, 22b and 22c use one or more field effect transistors. FIG. 22a is a conventional transmission gate. Applying switching signals such as the signals of FIG. 21c-1 or 21c-2 to terminal 121, a terminal 122 is either grounded or has a high impedance. The circuit of FIG. 22a consists of P-channel field effect transistors 125 and N-channel field effect transistors 126. The voltage $+V_1$ is applied to terminal 123 and the voltage of $-V_1$ is applied to terminal 124.

In FIG. 22b, P-channel transistor 127 is connected with the voltage $+V_1$ applied to the terminal 123. In this switch, by applying an inverted signal of the switching signal of FIG. 21c-1 or 21c-2 to the terminal 121, the terminal 122 is either grounded or has a high impedance.

FIG. 22c shows the case where an N-channel transistor 128 is used for the switch and the voltage $-V_1$ is applied to the terminal 124. In this case, by applying the same switching signal as that used with respect to FIG. 22a to terminal 121, the terminal 122 is grounded or has a high impedance.

As aforenoted with reference to FIG. 12, the required response characteristic is obtained when $f_L$ is 1 KHz, $f_H$ is 100 KHz, the temperature is 40° C. and $V_1$ is 30 V. In this case, the writing time $T_1$ is 2 msec. which is a high speed writing time. However, it is difficult to arrange 2,000 driving circuits in parallel fashion, each of which can output a signal having a voltage $V_1$ of 30 V and a peak-to-peak voltage of 60 V. The next embodiment of the invention to be described provides an electrophotographic printer utilizing liquid crystal micro-shutters driven by an epochal driving method so that the magnitude of the driving voltage, the number of driving circuits and the number of wiring connections are reduced to one-half, thereby making the most of the above-mentioned advantages.

FIGS. 23a and 23b depict glass base plates constituting the liquid crystal light valve in accordance with this embodiment. This embodiment is similar to that depicted in FIGS. 8 and 9. The difference is that glass base plate 11 is provided with two common electrodes, first common electrode 17 and second common electrode 18. The transparent electrode portions 14 which define the micro-shutters are alternatively located in connection with common electrodes 17 and 18. Though there are 2,000 signal electrodes required in the embodiment of FIGS. 9 and 10, the glass base plate 12 in this embodiment requires only 1,000 signal electrodes. Each of the signal electrodes 15', 16' are of double width so as to overlap two adjacent transparent electrode portions 14.

Figure 24:
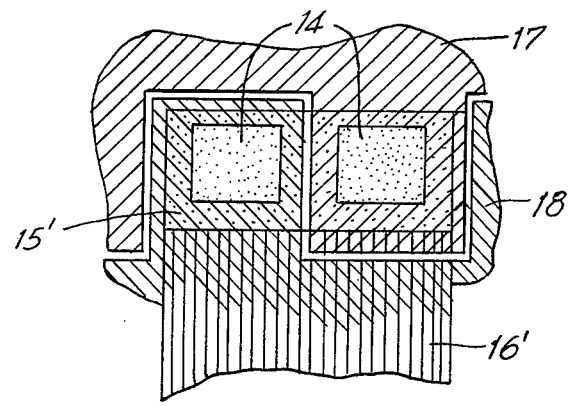
FIG. 24 depicts an alternative electrode arrangement on the glass base plates in accordance with the present invention.

FIG. 24 depicts the positional relationship between the common electrodes and the signal electrodes when plates 11 and 12 are positioned in spaced facing relation. The transparent electrode portions 15' of the signal electrodes are aligned with adjacent transparent electrode portions 14 of the two common electrodes 17 and 18. These overlapping portions of the transparent electrode portions 14 and 15' define the micro-shutters. Each signal electrode forms two micro-shutters. Thus, the light valve will have a total of 2,000 micro-shutters like the light valve depicted in FIGS. 8 and 9. Signals for driving these electrodes will now be described.

Figure 25:
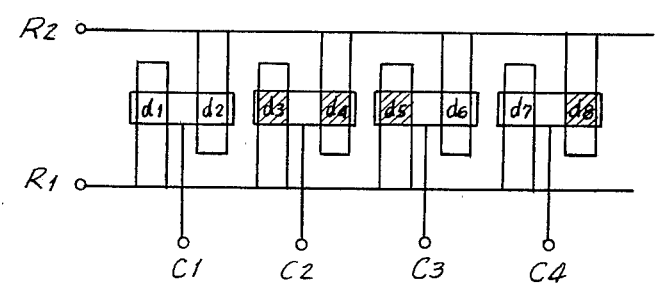
FIG. 25 is a schematic showing of an alternative embodiment of the electrode arrangement in accordance with the invention.

FIG. 25 is a schematic diagram of the micro-shutters. Terminals $R_1$ and $R_2$ are respectively connected to the first common electrode and the second common electrode. Terminals $c_1$–$c_4$ are representative signal electrodes terminals. This arrangement forms micro-shutters $d_1$–$d_8$. The shaded micro-shutters $d_3$, $d_4$, $d_5$ and $d_8$ are closed and the remaining micro-shutters $d_1$, $d_2$, $d_6$ and $d_7$ are open. With the driving method described below, a response characteristic similar to that of FIG. 12 is obtained in each micro-shutter with half the number of signal electrodes as shown in FIG. 25 and one-half driving voltage being utilized.

Figure 26:
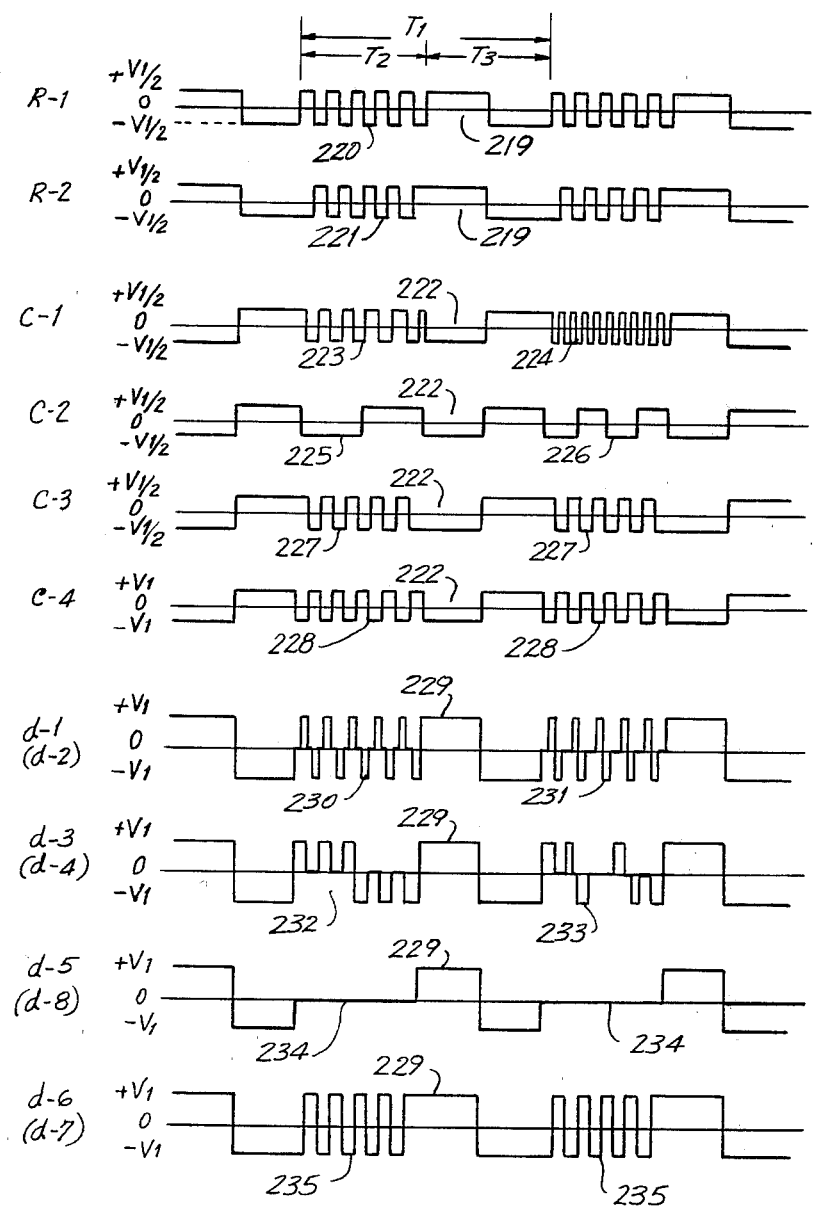
FIG. 26 is a graph depicting various driving signals for the liquid crystal material in accordance with the present invention.

FIG. 26 shows driving signals for opening and closing the micro-shutters shown in FIG. 25. Signals R-1 and R-2 are applied to the first and second common electrodes, respectively. The signals R-1 and R-2 are of the same wave form as the signal of FIG. 11a, but the voltages thereof are one-half the voltages of FIG. 11. $T_1$ is a writing time for one cycle. A signal of $f_L$ is applied during $T_3$ and a signal of $f_H$ is applied during $T_2$. The $f_H$ signal portion 220 of the signal R-1, which is applied during $T_2$, is 180° out of phase with the $f_H$ signal portion 221 of the signal R-2 also applied during $T_2$. Signals c-1-c-4 are the signals applied to the signal electrodes $c_1$–$c_4$, respectively. An $f_L$ signal portion 222 which is 180° out of phase with an $f_L$ signal portion 219 of signals R-1 and R-2 is applied to each signal electrode at all times during $T_3$. By way of example, four different signals c-1 to c-4 are applied to their respective signal electrodes during $T_2$. In the signal c-1, an $f_H$ signal portion 223 is shifted by $\frac{3}{4}$ period as compared with $f_H$ signal portion 220 of signal R-1 and further is shifted by $\frac{1}{4}$ period as compared with $f_H$ signal portion 221 of signal R-2. A signal portion 224 has a frequency twice as high as the normal $f_H$ signal. The phase relation between the signal portion 224 and the signals portions 220 and 221 are as shown in FIG. 26. In the signal c-2, signal portion 225 is an $f_L$ signal while signal portion 226 is a signal of a low frequency as compared with fc, which is different from the regular $f_L$ signal. In the signal c-3, as $f_H$ signal portion 227 is in phase with the $f_H$ signal portion 220 of signal R-1. In the signal c-4, $f_H$ signal portion 228 is in phase with $f_H$ signal portion 221 of signal R-2.

Applying these signals to their respective electrodes as detailed above, the micro-shutters are energized as shown in FIG. 26, waveforms d-1, d-3, d-5 and d-6 corresponding to micro-shutters d-1, d-3, d-5 and d-6. The waveforms for micro-shutters d-2, d-4, d-8 and d-7 correspond substantially with the signals d-1, d-3, d-5 and d-6. Signal portion 229 is a signal of $f_L$ frequency and the voltage thereof is $\pm V_1$. The signal portion 229 is applied to each micro-shutter and accordingly, all micro-shutters are closed during this time. The micro-shutter is opened only when a signal portion 230, 231 or 235 is applied. Otherwise, the micro-shutter remains closed. Accordingly, the micro-shutters are opened or closed as shown in FIG. 25. When the signals d-3 and d-5 are applied across the liquid crystal material, the micro-shutters are completely closed, and when the signals d-1 and d-6 are applied across the liquid crystal material, the micro-shutters have approximately the same response characteristics as that in FIG. 12. Thus, according to this embodiment, the magnitude of the driving voltage, the number of driving circuits and the number of wiring connections are reduced to one-half, and high speed liquid crystal micro-shutters are provided.

EXAMPLE 3

An example using the above-mentioned liquid crystal light valve as constructed with reference to FIGS. 23a, 23b and 23c and applying the signals depicted in FIG. 26, is described. The writing time $T_1$ of 2 msec. was achieved under the conditions that the above-mentioned liquid crystal light valve was kept at 40° C., the driving voltage $V_1$ was 15$v$, $f_L$ was 1 KHz and $f_H$ was 100 KHz. The openings of the micro-shutter were a square with a side 40 μm long. A halogen lamp of 1,000,000 cd/m$^2$ was used as the light source. Zinc oxide sensitized with Rose Bengal was used for the photosensitive portion of the printer. Writing electrostatic latent images, developing the images with toner and then fixing the images on the paper, dots of 80 μmΦ were formed according to the driving signals. Also, uniform dots were formed without any relevant variation in the dots due to the differences in driving signals.

Figure 27:
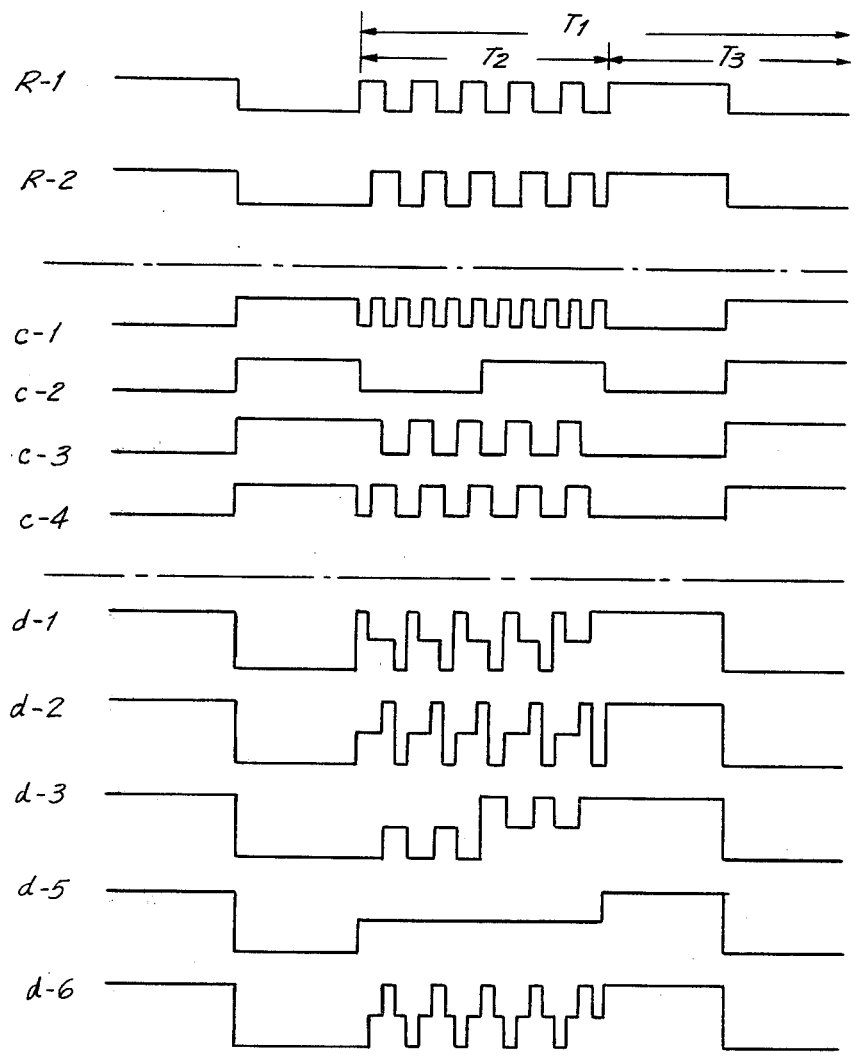
FIG. 27 is a graphic respresentation of alternative driving signals for driving the liquid crystal light valve in accordance with the present invention.

FIG. 27 depicts alternative wave forms of driving signals to $R_1$, $R_2$, $c_1$, $c_3$ and $c_4$ of FIG. 25. Waveforms d-1, d-2, d-3, d-5 and d-6 of FIG. 27 are associated driving signal waveforms which are effectively applied to the corresponding micro-shutters. It is noted that the waveforms applied across micro-shutters d-7 and d-8 are almost identical with those of waveforms d-6 and d-5, respectively. Waveforms R-1 and R-2 applied to the first and second common electrodes are almost identical with the waveform of FIG. 11a. The difference is that the $f_H$ signal portion in the signal R-2 is shifted by $\frac{1}{4}$ period from the $f_H$ signal portion in the signal R-1 and the voltages thereof are decreased by one-half. $T_1$ is one writing cycle. The signal of $f_L$ is applied during $T_3$ and the signal of $f_H$ is applied during $T_2$. Waveforms c-1-c-4 are applied to the respective signal electrodes. During $T_3$, the $f_L$ signal portions which are 180° out of phase with the $f_L$ signal portions of signals R-1 and R-2 are applied to all of the signal electrodes. By way of example, during $T_2$, a waveform to open both micro-shutters (c-1), a waveform to close both micro-shutters (c-2) and a waveform to open one of the two micro-shutters (c-3 or c-4) are applied to the respective signal electrodes. The voltages thereof are decreased by one-half like the signals R-1 and R-2 applied to the common electrodes. In order to open both micro-shutters of each pair, the signal c-1 having a signal portion of a frequency twice as high as the frequency of the $f_H$ signal portion applied to the common electrode is applied to the signal electrode during Thd 2. As a result, the associated waveforms d-1, d-2 as shown in FIG. 27 are applied to the micro-shutters $d_1$ and $d_2$ and both micro-shutters are opened simultaneously. In order to close both micro-shutters, the signal c-2 having a low frequency (this may be different from the signal of $f_L$ applied to the common electrode) is applied during $T_2$. As a result, the associated waveform d-3 is applied to the micro-shutters $d_3$ and $d_4$ and both micro-shutters are closed.

The case where either micro-shutter in the pair is opened will now be described. Since the waveform c-4 is fundamentally the same as the waveform c-3, only a 180° out of phase, a description will be given only with respect to waveform c-3. The waveform c-3 is provided so as to close micro-shutter $d_5$ to which associated waveforms R-1 and c-3 are applied. The waveform c-3 opens micro-shutter $d_6$ to which associated waveforms R-2 and c-3 are applied. The waveform c-3 is in phase with the waveform R-1 during $T_2$. Therefore, as shown in FIG. 27, the associated waveform d-5 is of planar shape and the associated signal d-6 is a modified high frequency waveform during $T_2$. As for the signal c-4, it is in phase with signal R-2 during $T_2$.

Figure 28:
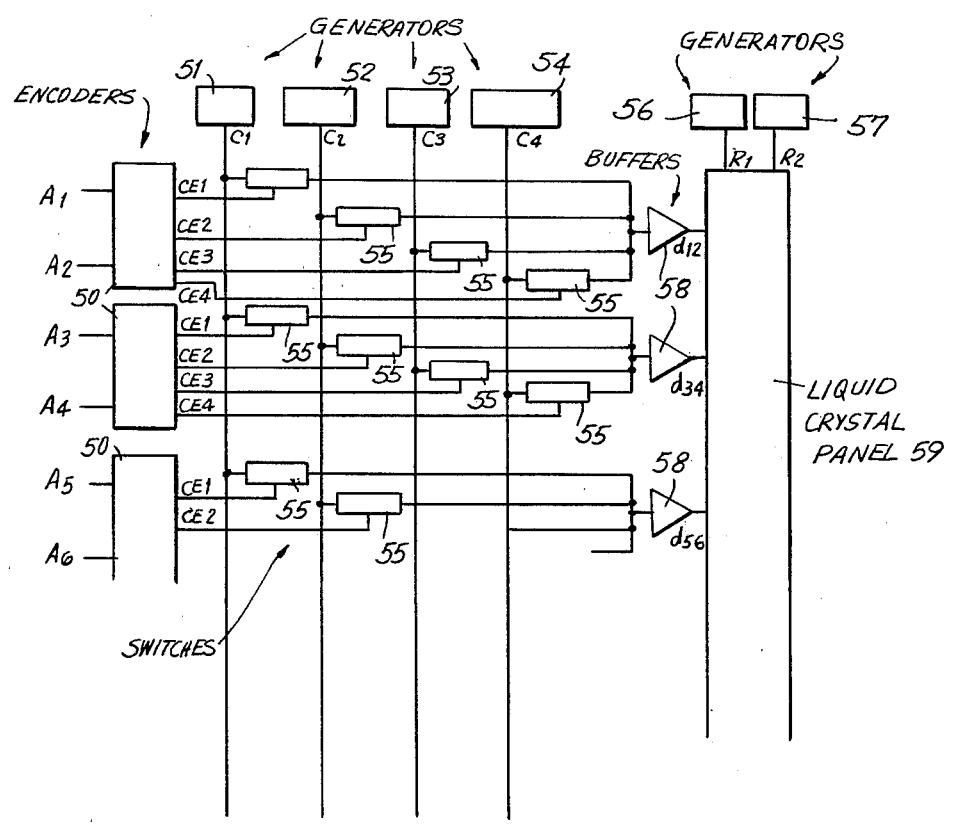
FIGS. 28 and 29 are schematic diagrams depicting a liquid crystal driving circuit constructed in accordance with the present invention.
Figures 29, 30:
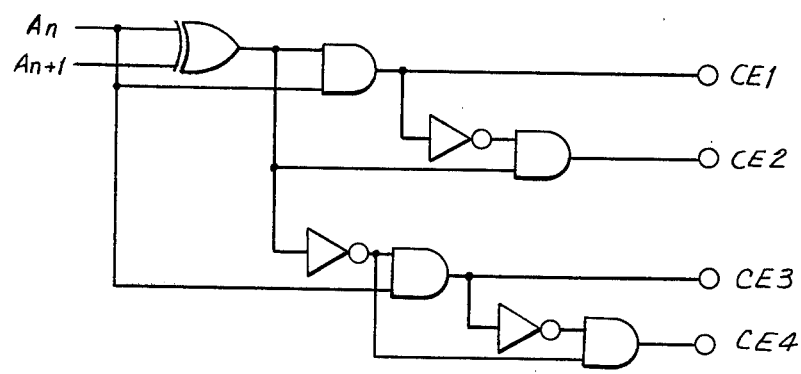
FIG. 30 is a logic table for the driving circuit depicted in FIGS. 28 and 29.

FIGS. 28 through 30 depict a liquid crystal driving circuit in accordance with this invention. Terminals $A_1$, $A_2$, - - - , $A_{2000}$ have the signals for driving the 2000 micro-shutters which are applied to respective encoders 50 by twos, and each pair of signals An and An+1 (in this example, n being an odd number) is encoded as tabulated in the logic table depicted in FIG. 30 by the circuit shown in FIG. 29 in detail. Signals CE1 to CE4 are determined according to the states of the signals An and An+1. Then, one of the generators 51 through 54 are selected. Generator 51 generates the waveform to open both micro-shutters in the pair. Generator 52 generates the waveform to close both micro-shutters in the pair. Generator 53 generates the wave form to open one of the pair of the micro-shutters numbered with n. Generator 54 generates the waveform to open the other of the pair of micro-shutters numbered n+1. By closing the respective switch 55, the selected waveform is transmitted to a buffer 58. The buffer 58 increases the voltage to a level required to drive the liquid crystal and the output from the buffer 58 is applied to a liquid crystal panel 59. Outputs from the two generators 56 and 57 generate the waveforms for the common electrodes and are also applied to the liquid crystal panel 59.

Figure 32:
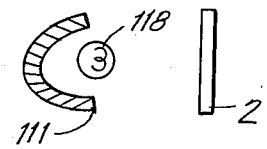
FIGS. 32 and 33 are schematic diagrams depicting alternative constructions of the light source utilizing an infrared ray penetrating and reflecting mirror, respectively.
Figure 33:
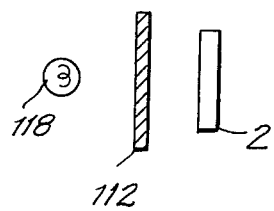

Referring now to FIGS. 32 and 33, it is noted that all of the illuminant energy from the light source is not always effective. The ultraviolet region of the illuminant energy can damage the polarizing plates of the liquid crystal light valve 2 (FIG. 1) to make them ineffective. It also has a bad influence on the liquid crystal material itself. Thus, the ultraviolet region affects the life of the light valve itself. On the other hand, the infrared region heats the liquid crystal and the polarizing plates so that it is difficult to control the temperature of the liquid crystal material. Accordingly, it is best to use a light source which includes as little of the ultraviolet region and the infrared region as possible.

In the case where an incandescent lamp 118 is used as the light source, an infrared ray penetrating mirror 111 is placed behind the light source 118 or an infrared ray reflecting mirror (a visible light penetrating mirror) 112 is placed in front of the light source 118, as shown in FIGS. 32 and 33, respectively. As a result the influence of the infrared region is removed as much as possible and satisfactory results are obtained.

Figure 34:
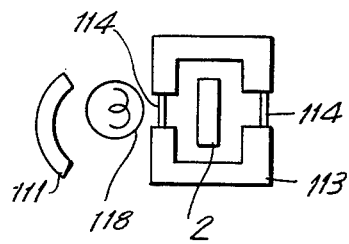
FIGS. 34 and 35 are schematic diagrams depicting alternative constructions of the light signal generating portion of the electro-photographic printer of the instant invention.
Figure 35:
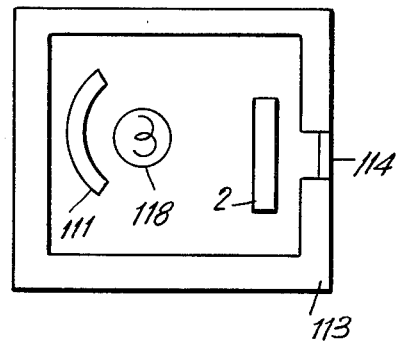

Since it is also important to control the temperature of the liquid crystal, the liquid crystal light valve 2 together with the light source 118 can be housed in a constant temperature box 113 as depicted in FIG. 35. Alternatively, the liquid crystal light valve 2 can be housed alone in the constant temperature box 113 as shown in FIG. 34. By housing the light valve 2 in a constant temperature box, the temperature of the liquid crystal remains stable. Transparent windows 114 are provided for allowing light into and out of the constant temperature boxes.

Figure 36:
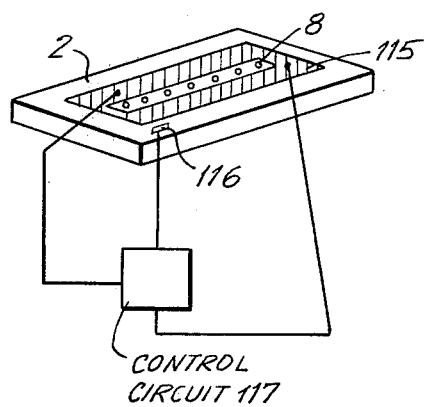
FIGS. 36 and 37 are schematic diagrams depicting alternative constructions of the liquid crystal light valve.
Figure 37:
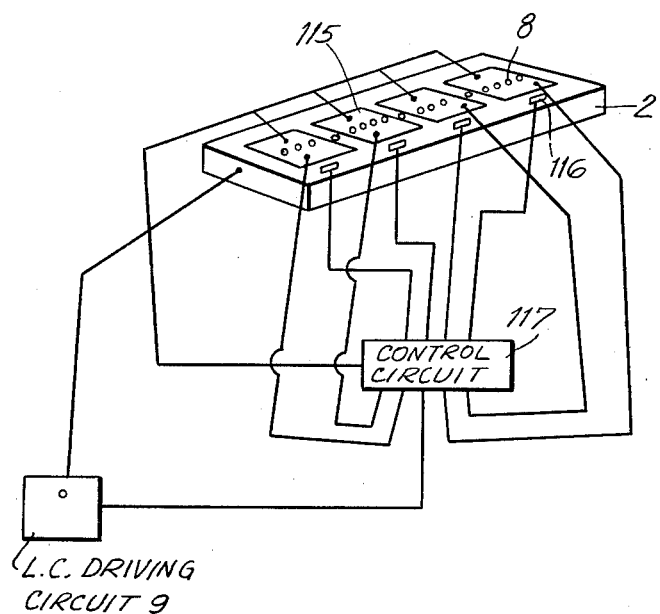

In order to control the temperature of the liquid crystal itself, the liquid crystal light valve 2 can be provided with a surface electric heating element 115 and a temperature sensor 116 to detect the temperature, the heating current being controlled by a control circuit 117 as depicted in FIG. 36. Where a large liquid crystal light valve is used, the surface electric heating element 115 can be divided into separate sections. Each separate surface electric heating section is provided with a temperature sensor 116, as shown in FIG. 37. Accordingly, a uniform distribution of temperature is obtained. Further, the electric parameter of the frequency, the voltage or the like of the output from the liquid crystal driving circuit 9 can be controlled by control circuit 117 and temperature compensation of the liquid crystal will be provided. Examples in accordance with the above description will now be described.

EXAMPLE 4

Figure 38:
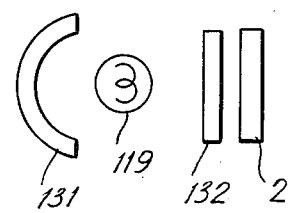
FIG. 38 is a schematic diagram depicting a construction of the light signal generating portion of the electro-photographic printer of the present invention.

Referring to FIG. 38, a fluorescent lamp 119 for a copying machine having an aluminate fluorescent substante was utilized as a light source. The light from lamp 119 included a minimal amount of ultraviolet and infrared rays thereby enhancing the temperature control and life of the light valve. By allowing the liquid crystal to age for a long time, the liquid crystal was minimally affected by the light source and the effect of the heating of the liquid crystal could be disregarded.

Additionally, by utilizing a parabolic mirror 131 through which the infrared rays penetrate, but which reflects visible light, and a flat mirror 132 which reflects the infrared rays and allows visible light to penetrate, completely satisfactory results were obtained.

EXAMPLE 5

Referring to FIGS. 34 or 35, by housing the light source and/or the light valve in a constant temperature box 113, the accuracy and the distribution of the temperature being ±1° C., the temperature change of the liquid crystal light valve 2 was ±0.7° C. between the environmental temperatures of 0° C. to 40° C. The influence of the temperature change upon the printing speed had no practical effect.

EXAMPLE 6

As shown in FIG. 37, a transparent surface electric heating element 115 which is divided into four sections was formed of nesa film on the liquid crystal light valve 2 which was 20 cm in length. A thermistor 115 was used as a temperature sensor for each section of the surface electric heating element. The temperature of each section was kept at 40° C. The performance of the liquid crystal light valve 2 was barely changed between 0° C. and 35° C. of the environmental temperature.

EXAMPLE 7

A liquid crystal light valve 2 of 4 μm thickness was provided including a liquid crystal having a dielectric constant of +1 at 1 KHz and −1 at 100 Hz. The valve included 2,000 micro-shutters of 50 μm width each which were arranged linearly with a pitch of 100 μm. The temperature was set at 30° C. A fluorescent lamp of 30,000 lux on the liquid crystal light valve was utilized as a light source. Printing on the paper of an electrofacsimile printer which had a reciprocating speed of 2 msec (duty cycle ½) was performed after applying a low frequency signal of 100 Hz ($f_L=100$ Hz) and a high frequency signal of 1 KHz ($f_H=1$ KHz), the electrostatic latent images were developed with toner and then were fixed. Dots of 100 μmp were formed in response to the printing signals. It took 6 seconds to write on one sheet of paper of A4 format.

The electro-photographic printer of the instant invention provides a printer which utilizes a liquid crystal cell as a light valve. The liquid crystal material in the cell, having an inversion of dielectric anisotropy at a relatively low frequency, can be selectively switched at high speeds under the driving methods disclosed herein. Accordingly, the electro-photographic printer of the present invention can be operated at the high speeds required for use as an output system for computers and the like and yet produces a high resolution and a high quality printing. The printer is compact in size and is inexpensive to manufacture.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An electro-photographic printer comprising light cell means having first and second opposed electrode means and a nematic liquid crystal material in a twisted nematic mode disposed between said first and second electrode means, said liquid crystal material having a dielectric anisotropy equal to zero at a relatively low critical frequency, fc, said critical frequency being less than 100 kHz when the temperature of said liquid crystal material is 40° C., the dielectric anisotropy being positive for frequencies below said critical frequency, fc, and negative for frequencies above said critical frequency, fc, illuminating means for directing light at one of said first and second electrode means, driving means coupled to said first and second electrode means for selectively driving said liquid crystal material by a two frequency driving mode so that light from said illuminating means is selectively transmitted through said cell means said driving means driving said liquid crystal material by selectively applying at least two signals across said liquid crystal material, a first said signal being a frequency fl, fl being lower than fc and a second signal being of frequency fh, fh being higher than fc, photo-sensitive means for receiving the light from said illuminating means transmitted through said cell means for forming an image in response thereto, said first electrode means including a common electrode having a plurality of transparent regions, said second electrode means including a plurality of signal electrodes, each said transparent region on said common electrode being in registration with one said signal electrode, the portions of said signal electrodes in registration with said transparent regions on said common electrode being transparent, the transparent regions of said common electrode and said signal electrodes in registration with one another defining micro-shutters, said driving means being coupled to said common electrode and each said signal electrode, said driving means being adapted to selectively apply at least said signals of frequency fH and fL to said common electrodes and said signal electrodes for selectively permitting the transmission of light from said illuminating means through said microshutters, said driving means selectively applying said signals to said common and signal electrodes in a plurality of writing times, a signal having an effective frequency fL being applied across said common and signal electrodes in each said writing time.

2. The electro-photographic printer as claimed in claim 1, wherein said image formed by said photo-sensitive means is an electrostatic latent image, said photo-sensitive means including developing means for developing said electrostatic latent image and transcribing means for transcribing said developed image onto a recording medium.

3. The electro-photographic printer, as claimed in claim 1, wherein said driving means selectively applies a signal of frequency fH to said common electrode and a signal of frequency fH 180° out of phase with said signal applied to said common electrode to at least one said signal electrode.

4. The electro-photographic printer, as claimed in claim 1, wherein said driving means selectively applies a signal of frequency fL to said common electrode and a signal of frequency fL 180° out of phase with said signal applied to said common electrode to at least one said signal electrode.

5. The electro-photographic printer, as claimed in claim 1, wherein said driving means selectively applies one of said signals of frequency fH and fL to said common electrode, said driving means applying a signal of frequency fL to at least one said signal electrode 180° out of phase with the signal of fL applied to said common electrode when said signal of fL is applied to said common electrode, said driving means applying to at least one said signal electrode one of a signal of frequency fL and a signal of frequency fH 180° out of phase with said signal of fH applied to said common electrode when said signal of fH is applied to said common electrode.

6. The electro-photographic printer, as claimed in claim 1, wherein said driving means selectively applies one of said signals of frequency fH and fL to said common electrode, each said signal electrode including switch means coupled to ground, said switch means including resistor means, said switch means being selectively switchable between a first position where said signal electrode is directly coupled to ground and a second position where said signal electrode is coupled through said respective resistor means to ground, said switch means being in said first position when said signal of frequency fL is applied to said common electrode, said switch means being selectively displaceable between said first position and said second position when said signal of frequency fH is applied to said common electrode.

7. The electro-photographic printer, as claimed in claim 1 or 2, wherein the light from said illuminating means includes minimal amounts of ultraviolet and infrared rays.

8. The electro-photographic printer, as claimed in claim 1 or 2, wherein said illuminating means includes an infrared ray blocking means for removing substantially all infrared rays from said light from said illuminating means.

9. The electro-photographic printer, as claimed in claim 8, wherein said blocking means is an infrared ray mirror which reflects visible light.

10. The electro-photographic printer, as claimed in claim 8, wherein said blocking means is an infrared ray blocking plate which allows visible light to pass therethrough.

11. The electro-photographic printer, as claimed in claim 1 or 2, including temperature means for keeping said liquid crystal material at a substantially constant temperature.

12. The electro-photographic printer, as claimed in claim 11, wherein said temperature means is a constant temperature box, said light cell means and said illuminating means being housed within said box, said box including an opening for 13. The electro-photographic printer, as claimed in claim 11, wherein said temperature means is a constant temperature box, said light cell means being disposed in said box, said box having a first opening for permitting light from said illuminating means to enter said box, said box including a second openiong for permitting the light transmitted through said cell means to pass out of said box.

14. The electro-photographic printer, as claimed in claim 11, wherein said temperature means is a heating means coupled to said cell means for keeping said cell means at a substantially constant temperature.

15. The electro-photographic printer, as claimed in claim 11, wherein said temperature means includes at least one temperature sensor means for detecting the temperature of said liquid crystal material and for producing temperature signals in response thereto and control means for heating said cell means in response to said temperature signals.

16. The electro-photographic printer, as claimed in claim 1 or 2, wherein the dielectric anisotropy of said liquid crystal material is negative when said high frequency signal, fH, is applied thereto, the dielectric anisotropy being positive when said low frequency signal, fL, is applied thereto.

17. An electro-photographic printer comprising light cell means having first and second opposed electrode means and a nematic liquid crystal material in a twisted nematic mode disposed between said first and second electrode means, said liquid crystal material having a dielectric anisotropy equal to zero at a relatively low critical frequency, fo, said critical frequency being less than 100 kHz when the temperature of said liquid crystal material is 40° C., the dielectric anisotropy being positive for frequencies below said critical frequency, Fc, and negative for frequencies above said critical frequency, fc illuminating means for directing light at one of said first and second electrode means, driving means coupled to said first and second electrode means for selectively driving said liquid crystal material by a two frequency driving mode so that light from said illuminating means is selectively transmitted through said cell means said driving means driving said liquid crystal material by selectively applying at least two signals across said liquid crystal material, a first said signal being a frequency fl, fl being lower than fc and a second signal being of frequency fh, fh being higher than fc, photo-sensitive means for receiving the light from said illuminating means transmitted through said cell means for forming an image in response thereto, said first electrode means including a common electrode having a plurality of transparent regions, said second electrode means including a plurality of signal electrodes, each said transparent region on said common electrode being in registration with one said signal electrode, the portions of said signal electrodes in registration with said transparent regions on said common electrode being transparent, the transparent regions of said common electrode and said signal electrodes in registration with one another defining micro-shutters, said driving means being coupled to said common electrode and each said signal electrode, said driving means being adapted to selectively apply at least said signals of frequency of fH and fL to said common electrodes and said signal electrodes for selectively permitting the transmission of light from said illuminating means through said micro-shutters, said driving means selectively applying a signal of frequency fH to said common electrode and a signal of frequency fH 180° out of phase with said signal applied to said common electrode to at least one said signal electrode.

18. The electro-photographic printer, as claimed in claim 1, 2, 3 or 11, wherein said light cell means includes first and second polarizing means, the direction of polarization action of said first polarizing means being perpendicular to the direction of polarization of said second polarizing means, said first and second electrode means and said liquid crystal material therebetween being disposed intermediate said first and second polarizing means.

19. The electro-photographic printer, as claimed in claim 1, 2, 3 or 17, wherein said light cell means includes a first and second insulated base plate, said liquid crystal material being disposed intermediate said first and second plates, said first electrode means being disposed on said first plate adjacent said liquid crystal material, said second electrode means being disposed on said second plate adjacent said liquid crystal material.

20. The electro-photographic printer, as claimed in claim 19, wherein said first electrode means includes a plurality of first transparent regions, said second electrode means including a plurality of second transparent regions in registration with said first transparent regions, each pair of said first and second transparent regions in registration with one another defining a micro-shutter, the remaining regions of said first and second electrode means being opaque.

21. The electro-photographic printer, as claimed in claim 19, wherein said base plates are glass, the regions of said glass base plates other than where said microshutters are defined being opaque.

22. The electro-photographic printer, as claimed in claim 19, wherein said light cell means includes first and second polarizing means, the direction of polarizing action of said first polarizing means being perpendicular to the direction of polarization of said second polarizing means, said first and second electrode means and said liquid crystal material therebetween being disposed intermediate said first and second polarizing means.

23. The electro-photographic printer, as claimed in claim 22, wherein light from said illuminating means is prevented from passing through at least one said microshutter when a signal of frequency fL is applied between said common electrode and said signal electrode defining said at least one micro-shutter.

24. The electro-photographic printer, as claimed in claim 22, wherein light from said illuminating means is transmitted through at least one said micro-shutter when a signal of frequency fH is applied between the common electrode and said signal electrode defining said at least one micro-shutter.

25. The electro-photographic printer, as claimed in claim 22, wherein light from said illuminating means is transmitted through at least one micro-shutter when a signal having a frequency varying from fH down to fL is applied between the common electrode and said signal electrode defining said at least one micro-shutter.

26. An electro-photographic printer comprising light cell means having first and second opposed electrode means and a nematic liquid crystal material in a twisted nematic mode disposed between said first and second electrode means, said liquid crystal material having a dielectric anisotropy equal to zero at a relatively low critical frequency, fc, said critical frequency being less than 100 kHz when the temperature of said liquid crystal material is 40° C., the dielectric anisotropy beng positive for frequencies below said critical frequency, fc, and negative for frequencies above said critical frequency, fc illuminating means for directing light at one of said first and second electrode means, driving means coupled to said first and second electrode means for selectively driving said liquid crystal material by a two frequency driving mode so that light from said illuminating means is selectively transmitted through said cell means said driving means driving said liquid crystal material by selectively applying at least two signals across said liquid crystal material, a first said signal being a frequency fl, fl being lower than fc and a second signal being of frequency fh, fh being higher than fc, photo-sensitive means for receiving the light from said illuminating means transmitted through said cell means for forming an image in response thereto, said first electrode means including first and second common electrodes, said first and second common electrodes each having a plurality of transparent regions, said second electrode means including a plurality of signal electrodes, each said signal electrode being in registration with a transparent region on said first common electrode and a transparent region on said second common electrode, the portions of said signal electrodes in registration with said transparent regions on said first and second common electrodes being transparent, said driving means selectively applying said signals to said first and second common electrodes and said signal electrodes in a plurality of writing times, a signal having an effective frequency fL being applied across said first and second common electrodes and said signal electrodes in each said writing time.

27. An electro-photographic printer comprising light cell means having first and second opposed electrode means and a nematic liquid crystal material in a twisted nematic mode disposed between said first and second electrode means, said liquid crystal material having a dielectric anisotropy equal to zero at a relatively low critical frequency, fc, said critical frequency being less than 100 kHz when the temperature of said liquid crystal material is 40° C., the dielectric anisotropy beng positive for frequencies below said critical frequency, fc, and negative for frequencies above said critical frequency, fc, illuminating means for directing light at one of said first and second electrode means, driving means coupled to said first and second electrode means for selectively driving said liquid crystal material by a two frequency driving mode so that light from said illuminating means is selectively transmitted through said cell means said driving means said liquid crystal material by selectively applying at least two signals across said liquid crystal material, a first said signal being a frequency fl, fl being lower than fc and a second signal being of frequency fh, fh being higher than fc, photo-sensitive means for receiving the light from said illuminating means transmitted through said cell means for forming an image in response thereto, said first electrode means including a common electrode having a plurality of transparent regions, said second electrode means including a plurality of signal electrodes, each said transparent region on said common electrode being in registration with one said signal electrode, the portions of said signal electrodes in registration with said transparent regions on said common electrode being transparent, the transparent regions of said common electrode and said signal electrodes in registration with one another defining micro-shutters, said driving means being coupled to said common electrode and each said signal electrode, said driving means being adapted to selectively apply at least said signals of frequency of fH and fL to said common electrodes and said signal electrodes for selectively permitting the transmission of light from said illuminating means through said micro-shutters, said driving means selectively applying a signal of frequency fL to said common electrode and a signal of frequency fL 180° out of phase with said signal applied to said common electrode to at least one said signal electrode.

28. An electro-photographic printer comprising light cell means having first and second opposed electrode means and a nematic liquid crystal material in a twisted nematic mode disposed between said first and second electrode means, said liquid crystal material having a dielectric anisotropy equal to zero at a relatively low critical frequency, fc, said critical frequency being less than 100 kHz when the temperature of said liquid crystal material is 40° C., the dielectric anisotropy beng positive for frequencies below said critical frequency, fc, and negative for frequencies above said critical frequency, fc illuminating means for directing light at one of said first and second electrode means, driving means coupled to said first and second electrode means for selectively driving said liquid crystal material by a two frequency driving mode so that light from said illuminating means is selectively transmitted through said cell means said driving means driving said liquid crystal material by selectively applying at least two signals across said liquid crystal material, a first said signal being a frequency fl, fl being lower than fc and a second signal being of frequency fh, fh being higher than fc, photo-sensitive means for receiving the light from said illuminating means transmitted through said cell means for forming an image in response thereto, said first electrode means including a common electrode having a plurality of transparent regions, said second electrode means including a plurality of signal electrodes, each said transparent region on said common electrode being in registration with one said signal electrode, the portions of said signal electrodes in registration with said transparent regions on said common electrode being transparent, the transparent regions of said common electrode and said signal electrodes in registration with one another defining micro-shutters, said driving means being coupled to said common electrode and each said signal electrode, said driving means being adapted to selectively apply at least said signals of frequency of fH and fL to said common electrodes and said signal electrodes for selectively permitting the transmission of light from said illuminating means through said microshutters, said driving means selectively applying one of said signals of frequency fH and fL to said common electrode, and driving means applying a signal of frequency fL to at least one said signal electrode 180° out of phase with the signal of fL applied to said common electrode when said signal of fL is applied to said common electrode, said driving means applying to at least one said signal electrode one of a signal of frequency fL and a signal of frequency fH 180° out of phase with said signal of frequency fH applied to said common electrode when said signal of frequency fH is applied to said common electrode.

29. An electro-photographic printer comprising light cell means having first and second opposed electrode means and a nematic liquid crystal material in a twisted nematic mode disposed between said first and second electrode means, said liquid crystal material having a dielectric anisotropy equal to zero at a relatively low critical frequency, fc, said critical frequency being less than 100 kHz when the temperature of said liquid crystal material is 40° C., the dielectric anisotropy beng positive for frequencies below said critical frequency, fc, and negative for frequencies above said critical frequency, fc illuminating means for directing light at one of said first and second electrode means, driving means coupled to said first and second electrode means for selectively driving said liquid crystal material by a two frequency driving mode so that light from said illuminating means is selectively transmitted through said cell means said driving means driving said liquid crystal material by selectively applying at least two signals across said liquid crystal material, a first said signal being a frequency fl, fl being lower than fc and a second signal being of frequency fh, fh being higher than fc, photo-sensitive means for receiving the light from said illuminating means transmitted through said cell means for forming an image in response thereto, said first electrode means including a common electrode having a plurality of transparent regions, said second electrode means including a plurality of signal electrodes, each said transparent region on said common electrode being in registration with one said signal electrode, the portions of said signal electrodes in registration with said transparent regions on said common electrode being transparent, the transparent regions of said common electrode and said signal electrodes in registration with one another defining micro-shutters, said driving means being coupled to said common electrode and each said signal electrode, said driving means being adapted to selectively apply at least said signals of frequency of fH and fL to said common electrodes and said signal electrodes for selectively permitting the transmission of light from said illuminating means through said micro-shutters, said driving means selectively applying one of said signals of frequency fH and fL to said common electrode, each said signal electrode including switch means coupled to ground, said switch means including resistor means, said switch means being selectively switchable between a first position where said signal electrode is directly coupled to ground and a second position where said signal electrode is coupled through said respective resistor means to ground, said switch means being in said first position when said signal of frequency fL is applied to said common electrode, said switch means being selectively displaceable between said first position and said second position when said signal of frequency fH is applied to said common electrode.

30. An electro-photographic printer comprising light cell means having first and second opposed electrode means and a nematic liquid crystal material in a twisted nematic mode disposed between said first and second electrode means, said liquid crystal material having a dielectric anisotropy equal to zero at a relatively low critical frequency, fc, said critical frequency being less than 100 kHz when the temperature of said liquid crystal material is 40° C., the dielectric anisotropy beng positive for frequencies below said critical frequency, fc, and negative for frequencies above said critical frequency, fc illuminating means for directing light at one of said first and second electrode means, driving means coupled to said first and second electrode means for selectively driving said liquid crystal material by a two frequency driving mode so that light from said illuminating means is selectively transmitted through said cell means said driving means driving said liquid crystal material by selectively applying at least two signals across said liquid crystal material, a first said signal being a frequency fl, fl being lower than fc and a second signal being of frequency fh, fh being higher than fc, photo-sensitive means for receiving the light from said illuminating means transmitted through said cell means for forming an image in response thereto, said first electrode means including first and second common electrodes, said first and second common electrodes each having a plurality of transparent regions, said second electrode means including a plurality of signal electrodes, each said signal electrode being in registration with a transparent region on said first common electrode and a transparent region on said second common electrode, the portions of said signal electrodes in registration with said transparent regions on said first and second common electrodes being transparent.

31. The electro-photographic printer, as claimed in claim 26 or 30, wherein said driving means is adapted to selectively apply at least signals of frequency fL and fH across said first and second common electrodes and said signal electrodes.

32. The electro-photographic printer, as claimed in claim 31 or 30, wherein said signals of frequency fL applied to said first and second common electrodes are of the same rectangular waveform, said signals of frequency fH applied to said first and second common electrodes being of rectangular waveform 180° out of phase with respect to one another.

33. The electro-photographic printer, as claimed in claim 32 or 30, wherein said driving means applies a signal 180° out of phase with the signal of frequency fL to at least one said signal electrode when said signal of frequency fL is applied to said first and second common electrodes.

34. The electro-photographic printer, as claimed in claim 33 or 30, wherein when said driving means applies signals of frequency fH to said first and second common electrodes, said driving means applying to at least one said signal electrode a signal from the group comprising (1) a signal of frequency fH in phase with said signal of fH applied to said first common electrode, (2) a signal of fH in phase with said signal of fH applied to said second common electrode, (3) a signal of fH shifted by ¼ period or ¾ period from said signal of fH applied to one of said first and second common electrodes, (4) a signal of frequency twice as high as said signal of fH in phase with said signal of fH applied to one of said first and second electrodes, (5) a signal identical with said signal of fL applied to said first and second common electrodes and (6) a signal of frequency lower than fC but of a different frequency from said signal of fL applied to said first and second common electrodes.

35. The electro-photographic printer, as claimed in claim 31 or 30, wherein said signals of fH applied to said first and second common electrodes are of the same wave form, said signals of fL applied to said first and second common electrodes being shifted by ¼ period with respect to one another, said driving means applying a signal of fL to at least one said signal electrode 180° out of phase with said signal of fL applied to said first and second common electrodes when said signal of fL is applied to said first and second common electrodes, said driving means applying to at least one said signal electrode a signal from the group comprising (1) a signal having a frequency of fH, twice as high as the signal of fH, (2) a signal of fH, and (3) a signal of fL, when said signal of fH is applied to said first and second common electrodes.

36. The electro-photographic printer, as claimed in claim 35 or 30, wherein said driving means selectively applies a signal of frequency fH to said first common electrode and a signal of frequency fH having a shifted phase relationship from said signal fH applied to said first common electrode is applied to said second common electrode, said driving means applying a signal of fH to at least one said signal electrode which signal is identical to at least one such signal of fH applied to said first and second common electrodes.

* * * * *